(12) United States Patent
Wright

(10) Patent No.: US 12,147,452 B2
(45) Date of Patent: Nov. 19, 2024

(54) NOVELTY DETECTION SYSTEM

(71) Applicant: THATDOT, INC., Portland, OR (US)

(72) Inventor: Ryan Wright, Portland, OR (US)

(73) Assignee: THATDOT, INC., Portland, OR (US)

( * ) Notice: Subject to any disclaimer, the term of this patent is extended or adjusted under 35 U.S.C. 154(b) by 38 days.

(21) Appl. No.: 17/356,191

(22) Filed: Jun. 23, 2021

(65) Prior Publication Data

US 2021/0406288 A1 Dec. 30, 2021

Related U.S. Application Data

(60) Provisional application No. 63/043,727, filed on Jun. 24, 2020.

(51) Int. Cl.
| | | |
|---|---|---|
| *G06F 16/28* | (2019.01) | |
| *G06F 16/901* | (2019.01) | |
| *G06F 18/22* | (2023.01) | |
| *G06F 18/2433* | (2023.01) | |
| *G06N 7/01* | (2023.01) | |

(52) U.S. Cl.
CPC .......... *G06F 16/287* (2019.01); *G06F 16/288* (2019.01); *G06F 16/9027* (2019.01); *G06F 18/22* (2023.01); *G06F 18/2433* (2023.01); *G06N 7/01* (2023.01)

(58) Field of Classification Search
CPC .. G06F 16/287; G06F 16/288; G06F 16/9027; G06F 18/22; G06F 18/2433; G06N 7/01
See application file for complete search history.

(56) References Cited

U.S. PATENT DOCUMENTS

| | | | | |
|---|---|---|---|---|
| 10,673,880 | B1* | 6/2020 | Pratt | G06F 21/554 |
| 2020/0074012 | A1* | 3/2020 | Huebner | H04L 63/1425 |

FOREIGN PATENT DOCUMENTS

CN 104268157 A * 1/2015 ............. G06F 17/30

OTHER PUBLICATIONS

Timothy LaRock, "HYPA: Efficient Detection of Path Anomalies in Time Series Data on Networks." Cornell University Library Jan. 29, 2020 Sections 1-3 and Figure 2. https://arxiv.org/abs/1905.10580 (Year: 2020).*
Eberle et al., "Discovering Structural Anomalies in Graph-Based Data," Seventh IEEE international conference on data mining workshops (ICDMW 2007) 2007, Oct. 28, 2007, 13 pages.
Venkatesan et al., "Graph based Unsupervised Learning Methods for Edge and Node Anomaly Detection in Social Network," 2019 IEEE 1st International Conference on Energy, Systems and Information Processing (ICESIP) 2019, Jul. 4, 2019, 5 pages.

* cited by examiner

*Primary Examiner* — Hosain T Alam
*Assistant Examiner* — Anthony G Gemignani
(74) *Attorney, Agent, or Firm* — Davis Wright Tremaine LLP

(57) ABSTRACT

A graph-based novelty detection system processes a stream of observations by storing a compressed representation of the observations in a graph. Each node of the graph represents a component of an observation and a count of a number of times that component has been observed. The system calculates a novelty score based, at least in part, on a conditional probability of one or more components of the observation.

20 Claims, 19 Drawing Sheets

NOVELTY DETECTION SYSTEM

CROSS-REFERENCE TO RELATED APPLICATIONS

This application claims priority to U.S. Provisional Patent Application No. 63/043,727, filed Jun. 24, 2020, entitled "GRAPHICAL NOVELTY TECHNIQUE AND SYSTEM," the disclosure of which is hereby incorporated herein in its entirety.

BACKGROUND

Modern techniques for anomaly detection are constrained to operating on numerical values. The typical approach collects a batch of numeric observations into a large matrix, for which anomaly scores are computed for each row in the matrix based on complex mathematical relationships of the features represented in the columns. This technique works for batch-processed data with a small number of features, but cannot handle streaming data, non-numerical data, or data with a large or changing number of features.

BRIEF DESCRIPTION OF THE DRAWINGS

Various techniques will be described with reference to the drawings, in which.

DETAILED DESCRIPTION

Figure 1:
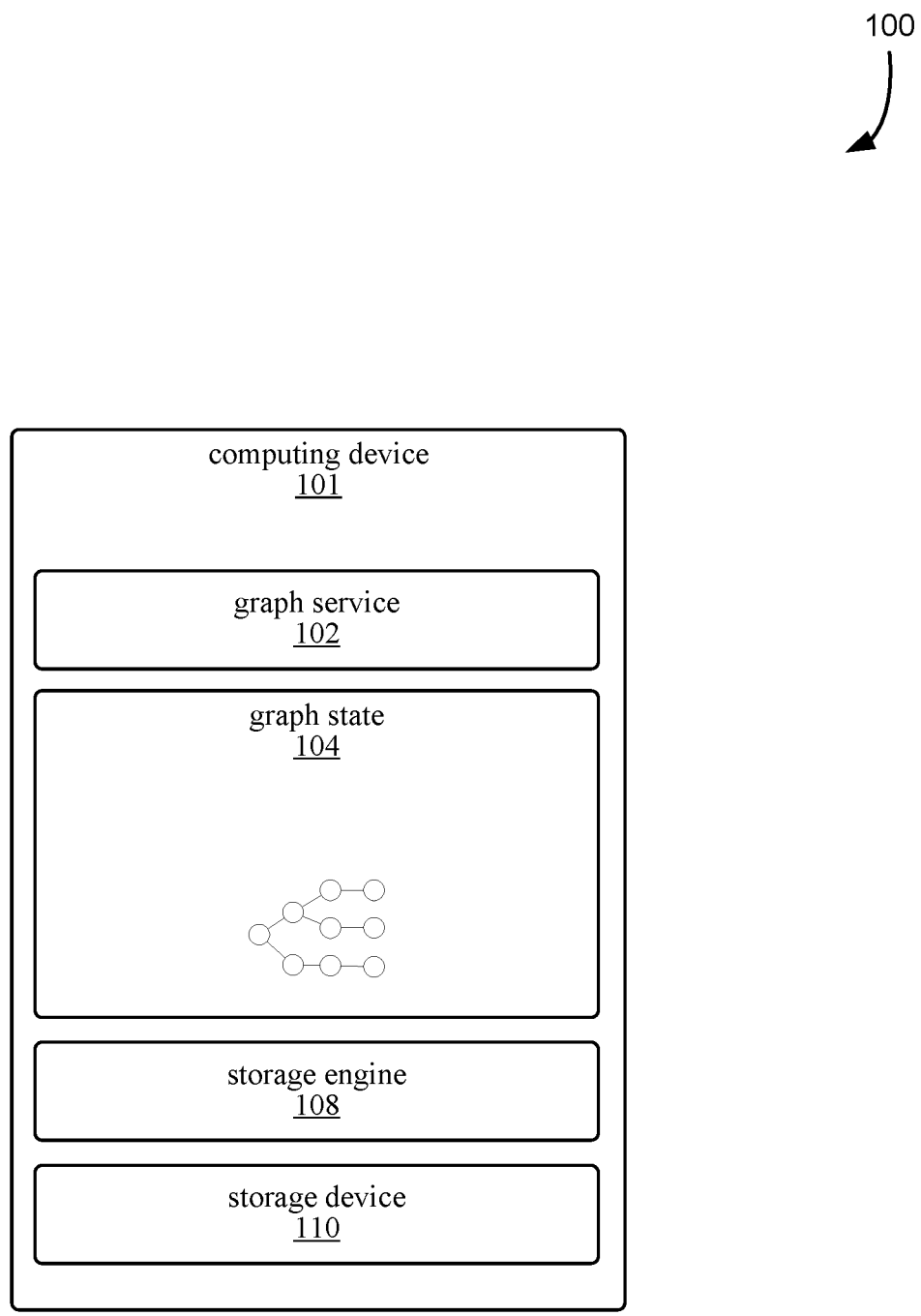
FIG. 1 illustrates an example of a graph-based novelty detection system, in accordance with at least one embodiment.

In an example, a graph-based novelty detection system is capable of calculating a score indicating how unusual or anomalous a given observation is with respect to previous observations made by that system. This is achieved by dynamically creating a graph model that represents the data and frequency of each observed component of the observations. This system can handle a data in a variety of types, including categorical, numerical, and structure forms of data.

In another example, a graph-based novelty detection system is implemented using a graph-based database system. This graph database system comprises a graph interpreter capable of distributed execution of queries and commands by distributing the high-level instructions to individual nodes of a graph, where the graph's nodes are backed by actors, an efficient abstraction over operating system threads or CPUs, as needed to execute the queries and commands. Computation is done in parallel with each node of the graph acting independently and routing the remainder of the query dynamically based on the data that node manages internally. This system scales across a cluster of any number of computer systems, each potentially contributing memory and computational resources to the logical graph they represent together.

In another example, a graph-based novelty detection system comprises at least one processor and a memory storing instructions that, in response to execution by the at least one processor, cause the system to store, in a graph, a nodes that describe a first observation read from a stream of observations. Each nodes corresponds to a piece of categorical information in the observation, and contains information that indicates the number of times this piece of categorical information have been observed in the stream of observations. The memory includes further instructions which, in response to execution by the at least one processor, cause the system to calculate a score that describes the degree to which the first observation is an outlier with respect to other observations read from the stream of observations. The score is calculated based on the information, read from the node, which indicates the number of times the piece of categorical information has been observed. The score is then sent to a client process.

In at least one embodiment, the graph is constructed so that the system takes an input observation and traverses the existing graph based on the components of that observation. If the graph does not contain a node that corresponds to a component, a new node is created. If the graph does contain such a node, a counter is incremented to indicate that the piece of information that corresponds to that component has been observed an additional time. Accordingly, once an observation has been added to the graph, the graph comprises an ordered sequence of nodes, as defined by a traversal of the graph based on the observation's components, which corresponds to an observation read from the stream of observations. Each node on this path contains information which counts the number of times a corresponding piece of information has been observed.

In at least one embodiment, the graph stores information for multiple observations, so that at least some of these will overlap. As such, if a first set of nodes corresponds to a first observation, and a second set of nodes corresponds to a second observation, it may be the case that at least some of the nodes that correspond to the first observation will overlap with the second. In such cases, when an observation is added and a graph is traversed, the system may increment a counter that is in a node included in both the first and second set of nodes. This node represents a piece of information that occurs in both of the first and second observations, in the same position.

In at least one embodiment, the novelty score is calculated based on a conditional probability. The conditional probability is calculated using at least two consecutive nodes from the sequence, each of which contains a count indicating the number of times the node's corresponding piece of information has been observed. In a further aspect, the score is calculated based, at least in part, on weighted relative information conveyed by the number of times the piece of categorical information has been observed. In other embodiments, the novelty score may be calculated based on a joint probability, also calculated using at least two consecutive nodes from the sequence.

The examples just described are intended to provide an illustration of the various systems, techniques, and computer-program products described herein. However, these examples should not be construed so as to limit the scope of the present disclosure to only those embodiments which employ each of the various aspects just described. In particular, as would be appreciated by one of skill in the art, various embodiments may omit or alter certain aspects of the example embodiment. As such, no one aspect should, unless explicitly stated, be considered an essential element. Moreover, embodiments may combine certain of the above elements, as dictated by the constraints of logic, while omitting certain other aspects.

Novelty detection, sometimes referred to as anomaly detection, outlier detection, or novelty scoring, is a useful component of data analysis. Novelty detection comprises analyzing data to identify unexpected, unusual, or outlying data. For example, in at least one embodiment, novelty detection comprises using relationships between the data points in a dataset to determine which data points are common and which represent unusual examples.

Novelty detection may be particularly challenging to perform on categorical data. Here, categorical data refers to non-numerical data, such as characters, words, phrases, and other textual data. This could potentially include numeric data that has been converted to text, but not numeric data such as integers or floating point data. Furthermore, embodiments described herein perform anomaly detection without relying on converting textual data to numeric format.

Another challenge relates to the use of novelty detection in real time scenarios, or other scenarios where data is provided as a stream of data, rather than as a batch. Here, a stream of data refers to data that is provided serially and whose endpoint is not known a priori. In at least one embodiment, a graph-based novelty detection system is capable of generating useful novelty detection results based on observations read from a stream of data while the stream remains active.

Embodiments of the systems and techniques described herein may score the novelty of categorical data directly, without converting categorical data to numeric data, and can also be used with numeric data or combinations of numeric and categorical data. Embodiments may work in an iterative, streaming fashion so that one datum can be scored at a time without requiring the entire dataset to be processed before producing scored results. In at least one embodiment, the training is unsupervised, meaning that it does not require labeled training data. Embodiments of the systems and techniques described herein may also be able to deliver information about why a particular datum was scored as novel, or why a particular datum was not scored as novel.

In at least one embodiment, a graph-based novelty detection system or technique is used to find anomalies and outliers in a set of data. This may comprise determining how common or unique a datum is, or estimating the probability of a given datum occurring.

In at least one embodiment, a graph-based novelty detection system or technique is used to estimate whether a hypothetical observation would be common or unique, or to estimate the probability of such an observation occurring.

In at least one embodiment, a graph-based novelty detection system or technique is used to estimate how common or unique observations are. This may include, in some cases, ranking observations from most common to least common, or vice-versa. Embodiments may also provide capabilities to filter data based on commonality or uniqueness of an observation or datum.

In at least one embodiment, a graph-based novelty detection system is used to generate notifications or alarms. These may be used to direct the attention of other systems, or personnel, to potential issues. For example, embodiments described herein may be used in cybersecurity applications to rank or prioritize potential anomalies for further investigation by a cybersecurity analysis.

In at least one embodiment, a graph-based novelty detection system is used for behavior modeling and analysis.

In at least one embodiment, a graph-based novelty detection system is used for trend modeling and analysis.

In at least one embodiment, a graph-based novelty detection system is used in conjunction with training machine learning and other artificial intelligence algorithms.

In at least one embodiment, a graph-based novelty detection system is used to control data collection in a distributed system. For example, outlier data detected by a graph-based anomaly detection system may be used to modify data collection practices.

Note that although the present disclosure generally describes various functions being performed using a graph, embodiments may utilize any of a wide variety of structures that do not explicitly utilize a graph-structure. These alternative structures may, however, simulate certain aspects of the information conveyed by a graph, and may therefore be considered equivalent to a graph or a graph representation.

For example, in at least one embodiment, an array of tuples is used in place of a graph. The tuples may be composed of the information described herein as being part of a node. For example, a tuple might contain an ID (this could be used as the key/index of the array), a terminating counter, continuing counter, list of pointers (functioning as edges) to children tuples (functioning as nodes), and a pointer back to a parent tuple (also functioning as a node).

In at least one embodiment, for a tuple-based implementation, the update process, instead of traversing a graph, would start visiting tuples from the array, and use an approach similar to what is described herein. For example, a tuple-based system might increment a counter on the root tuple (with an index or ID of 0), and then check and see if it has a pointer to a child tuple that would represent the next component in the observation. If so, the system would visit this tuple, increment its counter, and continue. If it doesn't have a child to represent the next observation, the system could add a new tuple (with zero counts and no children) to the array, add a pointer to that tuple on the parent tuple, and then continue by visiting that tuple, incrementing its counts, and so on.

Numerous other graph representations or equivalents may also be used. Examples may include, but are not necessarily limited to, adjacency matrices, adjacency lists, edge lists, various other matrix or list-based representations, and adjacency maps.

FIG. 1 illustrates an example of a graph-based novelty detection system, in accordance with at least one embodiment. Embodiments of the graph-based novelty detection system 100 may perform any of a variety of anomaly detection tasks, including but not limited to those described here.

Embodiments of the graph-based novelty detection system 100 can include any of a variety of systems or devices that perform novelty detection operations using graph data. These may include graph databases and graph processing systems that are specialized for novelty calculations, as well as general-purpose graph database or graph processing systems. Herein, unless otherwise apparent from context or explicit disclaimer, the terms graph-based novelty detection system, graph database, and graph processing systems may be used interchangeably.

Conceptually, a graph is made up of a set of nodes connected by edges. The nodes and edges are associated with properties that provide additional information about the nodes or edges. Within the graph, the nodes may represent entities, and the edges may describe relationships, or links, between entities. Properties provide information applicable to an entity or relationship with which the property is associated. In at least one embodiment, a graph is stored in a computer memory using any of a variety of data structures, including those described in more detail herein. In at least one embodiment, a graph is stored as one or more collections of node and edge data structures. Although the term node may be used, depending on context, to refer to the conceptual notion of a node, it may also be used, depending on context, to refer to a storage structure used by various embodiments of the graph processing system disclosed herein. Likewise, the term edge may, depending on context, refer to the conceptual notion of an edge, or to data stored by the system to represent an edge.

In the example of FIG. 1, graph-based novelty detection system 100 comprises a computing device 101. The computing device 101 comprise software and/or hardware modules for implementing the various techniques described herein. In at least one embodiment, a module refers to software instructions that are loaded into a memory of a computing device and executed by one or more processors to perform a function described herein as being performed by the module.

In at least one embodiment, computing device 100 comprises a graph service module 102 and a storage engine module 108. In at least one embodiment, the graph service 102 performs functions related to maintaining a graph state 104. This may include allocating message processors to nodes, routing messages between nodes, initiating query processing, and so forth. The storage engine module 108 performs functions related to storing and retrieving data. This may include interfacing with a storage device 110 in order to store or retrieve node-related data.

The computing device 101 maintains a graph state 104. For example, in at least one embodiment, the graph state 104 is held in random-access memory of the computing device 100, on a persistent storage device, such as the depicted storage device 110, or in some combination of random-access memory and persistent storage. In some cases and embodiments, storage of the graph state 104 is distributed across a plurality of computing devices, similar to the depicted computing device 101, that each maintain a portion of the graph state 104.

The storage device 110, if included in computing device 101, can include solid-state disk drives, mechanical disk drives, optical drives, and so on, and may store data associated with the various nodes of a graph maintained by the computing device 101. In some cases and embodiments, the computing device 101 relies in whole or in part on an external device to storage graph data. In still other cases, the computing device 101 relies in whole or in part on a cloud-based storage service, or other similar service-based architecture, to store graph data.

In at least one embodiment, the graph-based novelty detection system 100 uses one or more of computing device 101 to provide a graph-based novelty detection service. This service may provide remote clients with access to one or more of the novelty detection capabilities provided herein, and may be accessed by remote clients via an interface or protocol. In one non-limiting example, a representational state transfer ("REST") protocol is used in implementing an application programming interface between a client and one or more computing devices 101 of the graph-based novelty detection system 100.

In at least one embodiment, a graph-based novelty detection system 100 provides novelty detection capabilities on an incremental basis, meaning that it can perform novelty detection independently of future data. This means, for example, that the system 100 can perform novelty detection based on data received from a stream up to an arbitrary point, rather than requiring a complete set of training data. In at least one embodiment, the system permits a single datum to be processed independently of upcoming or concurrent data. As the datum is processed, the state of the system 100 is updated incrementally in a way that is stable and provides for the correctness of the computation. This, in turn, permits the datum to be used incrementally and incorporated into a novelty detection. In at least one embodiment, this approach also allows for the system 100 to perform novelty detection in parallel with processing incoming data.

In at least one embodiment, the system 100 receives a datum from a stream of data. Upon receipt of the datum, the system 100 incrementally updates a graph state to incorporate the new datum. Examples of updating a graph state are described in FIGS. 4-6. After updating the graph state, the system 100 is capable of performing novelty detection in relation to the new datum, for example by doing so in accordance with techniques described in relation to FIG. 7.

In at least one embodiment, a graph-based novelty detection system 100 is designed to be connectable to stream processing tools, such as stream processing tools that can be used to deliver data via what might be called an event pipeline. In at least one embodiment, a compatible stream processing tool provides capabilities for capturing data from a real-time event source and routing this data on a stream delivered via the event pipeline. A stream processing tool may provide further capabilities, such as capabilities for manipulating or filtering events. In at least one embodiment, a stream processing tool functions as a pipeline to deliver data in an incremental fashion, while also supporting many of the complexities associated with high-volume, enterprise-level streaming data.

In at least one embodiment, the system 100 is connected to and receives data from a stream processing tool. Upon receipt of a datum, the system may incrementally update a graph state to incorporate the new datum, and provide novelty detection capabilities in relation to the new datum.

In another embodiment, the system 100 is connected to and provides data to a stream processing tool. Events related to the detection of a novel or anomalous event may be provided as an event that can be streamed to other applications that subscribe to the stream processing tool's event pipeline(s). For example, if a new datum is determined to represent an anomaly, the system 100 may generate an event which describes the anomaly and transmit that even to other applications that subscribe to such events via the stream processing tool.

In at least one embodiment, the system 100 receives data or requests via an application programming interface ("API"). In at least one embodiment, the system 100 receives data or requests via a hypertext transfer protocol ("HTTP") REST API. Examples of such interfaces include APIs to pass an individual datum or a batch of data for novelty scoring, as well as APIs for configuration, operation, maintenance, and data visualization.

Figure 2:
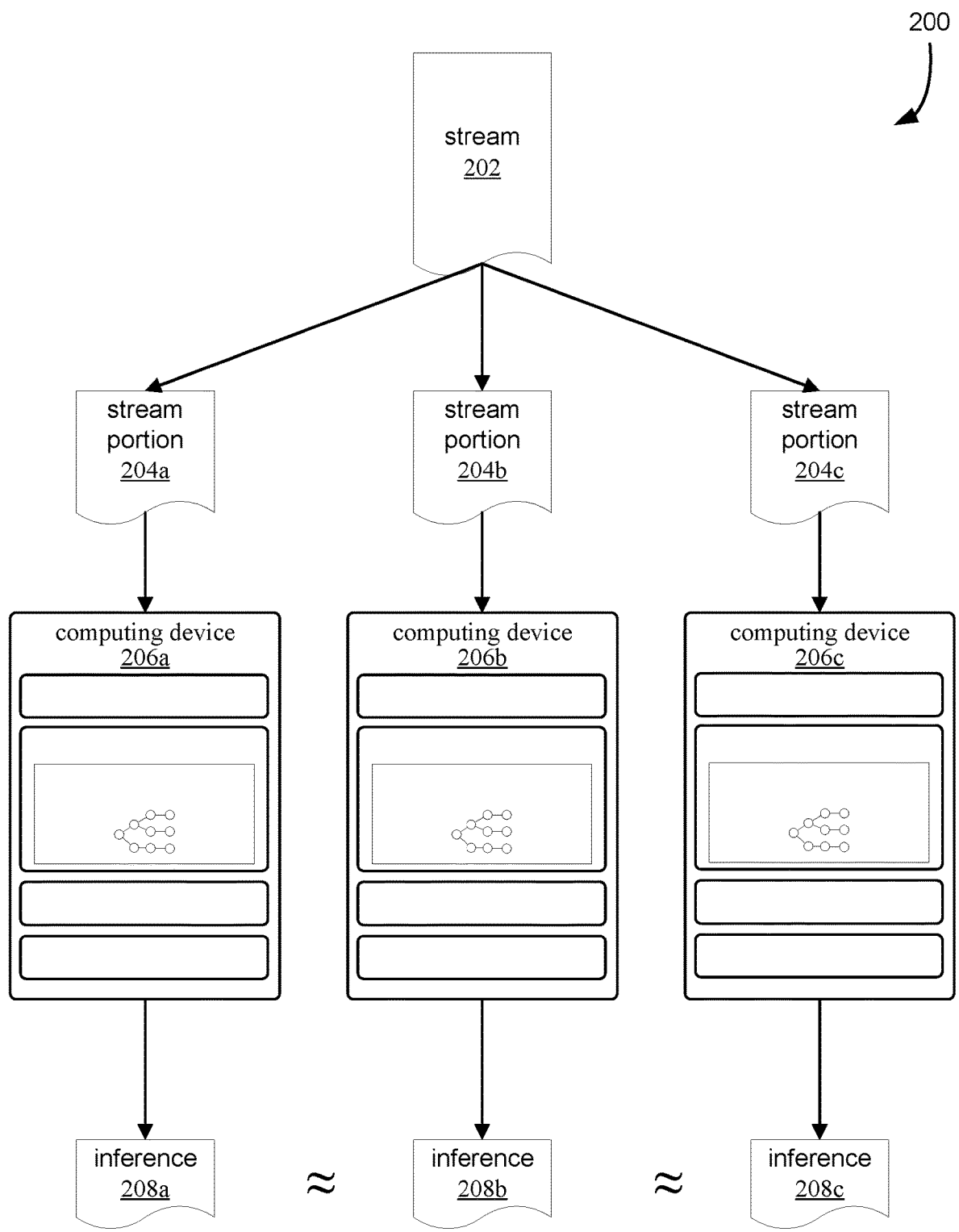
FIG. 2 illustrates an example of scaling a graph-based novelty detection system, in accordance with at least one embodiment.

FIG. 2 illustrates an example of scaling a graph-based novelty detection system, in accordance with at least one embodiment. Embodiments of the graph-based novelty detection system 200, as depicted in FIG. 2, may comprise a number of individual computing devices 206a-c, each of which is similar to the computing device 101 depicted in FIG. 1. In at least one embodiment, these computing devices each process a portion 204a-c of a stream 202. In at least one embodiment, the computing device 206a-c do not replicate or share data concerning their respective portions 204a-c of the stream 202 with the other computing devices 206a-c, and do not replicate or share data concerning their respective graph state with the other computing devices 206a-c. Nevertheless, by leveraging incremental update capabilities and statistical properties of data in the stream 202, each of the computing devices 206a-c is able to independently perform novelty detection with approximately equal results. This approach allows the system to be highly scalable.

In the graph-based novelty detection system 200 of FIG. 2, the stream 202 is split into stream portions 204a-c. In at least one embodiment, each of these portions 204a-c represents a distinct (i.e., non-overlapping) subset of the observations contained in stream 202. However, in this example it is presumed that over time, the stream portions 204a-c will each represent a statistically similar corpus of data. In light of this assumption, a given observation $O_n$ might be routed to any of the computing devices 206a-c, evaluated for novelty, and similar results obtained irrespective of which one of the computing devices 206a-c does the evaluation. Accordingly, for this observation $O_n$, the inferences 208a-c obtained by any of the computing devices 206a-c may be expected to be approximately equivalent. As used herein, an inference may refer to any estimation, approximation, conclusion, or classification. Accordingly, if each of the stream portions 204a-c contain similar distributions of data, any estimations, approximations, conclusions, or classifications made by the system 200 can be expected to be approximately equivalent regardless of which of the individual computing devices 206a-c is used to generate the inference.

Figure 3:
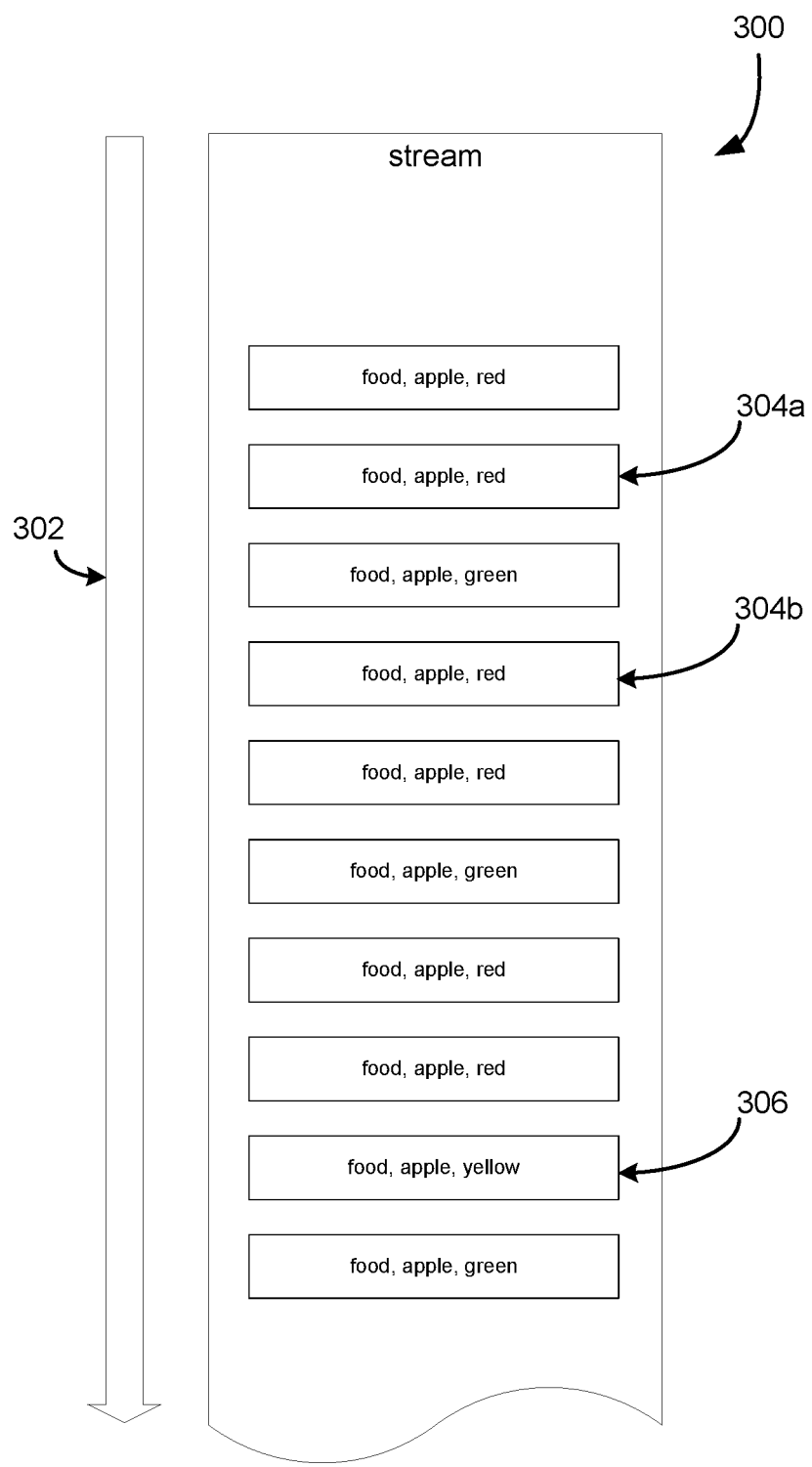
FIG. 3 illustrates an example of a stream of observations, in accordance with at least one embodiment.

Although data can be provided to a graph-based novelty system in a variety of ways, a number of embodiments may be configured to take in a stream of observations. FIG. 3 illustrates an example of a stream of observations, in accordance with at least one embodiment. In the example of FIG. 3, a stream 300 comprises a series of observations 304a,b, 306 ordered, and typically received, according to a timeline 302.

In at least one embodiment, a stream is represented as a sequence of JSON objects. These JSON objects can have any number of fields with values of any type, including nested objects. Although JSON, or any other data structure, can be used to represent the stream 300, a graph-based novelty detection system turns the input observations into a common structure, such as an array of strings.

An observation comprises one or more pieces of information. This may include numeric and categorical information, but as just noted, a graph-based novelty detection system may convert numeric information, or other non-textual data types, to a textual form. The system may then treat all components of an observation as categorical information.

A given observation contains a number of components, such as "food," "apple," and "red" in some of the observations 304a,b depicted in FIG. 3. Within a given context, the system may treat an observation as an ordered set of components. Here, context refers to a namespace that may be used to separate incoming data into different domains usable for different novelty-detection purposes. In at least one embodiment, a novelty detection score is computed for observations pertaining to a particular domain. For example, a numeric score may be computed from an observation, to describe how unusual that particular observation is, given prior observations in the same domain. The terms novel and anomalous may be used interchangeably in reference to an unusual observation, although in some specific contexts the term novel may be used to refer to an objective fact about the data, while anomalous may refer to an application-specific case in which a particular observation determined to be suspicious in some way, e.g., by implying an association between the observation and a malicious behavior.

In the example stream 300, it may be seen that certain observations may re-occur, such as the observations 304a,b of ["food," "apple," "red"]. Each observation might correspond to an event, such as observing a type of food that is an apple that is colored red. Other observations, however, may be more unusual, such as the observation 306 of ["food," "apple," "yellow"]. It will be appreciated that this example is intended to be illustrative rather than limiting, and that as such, the example should not be construed in a manner which would limit the scope of potential embodiments to only those that include the specific examples provided.

In at least one embodiment, a graph-based novelty detection system uses techniques derived from information theory and conditional probability to perform graph-based novelty scoring, in which a numeric score is determined to represent the degree to which an observation is unusual. In these techniques, information content is calculated based on a conditional probability of the observation components under consideration. The probability of a component is condition on the components, if any, in the observation being examined.

In at least one embodiment, a graph-based novelty detection system builds a graphical model dynamically, as observations stream into the system. A graphical model may be further understood in view of FIG. 4, which illustrates a graph-based representation of observations, in accordance with at least one embodiment.

Figure 4:
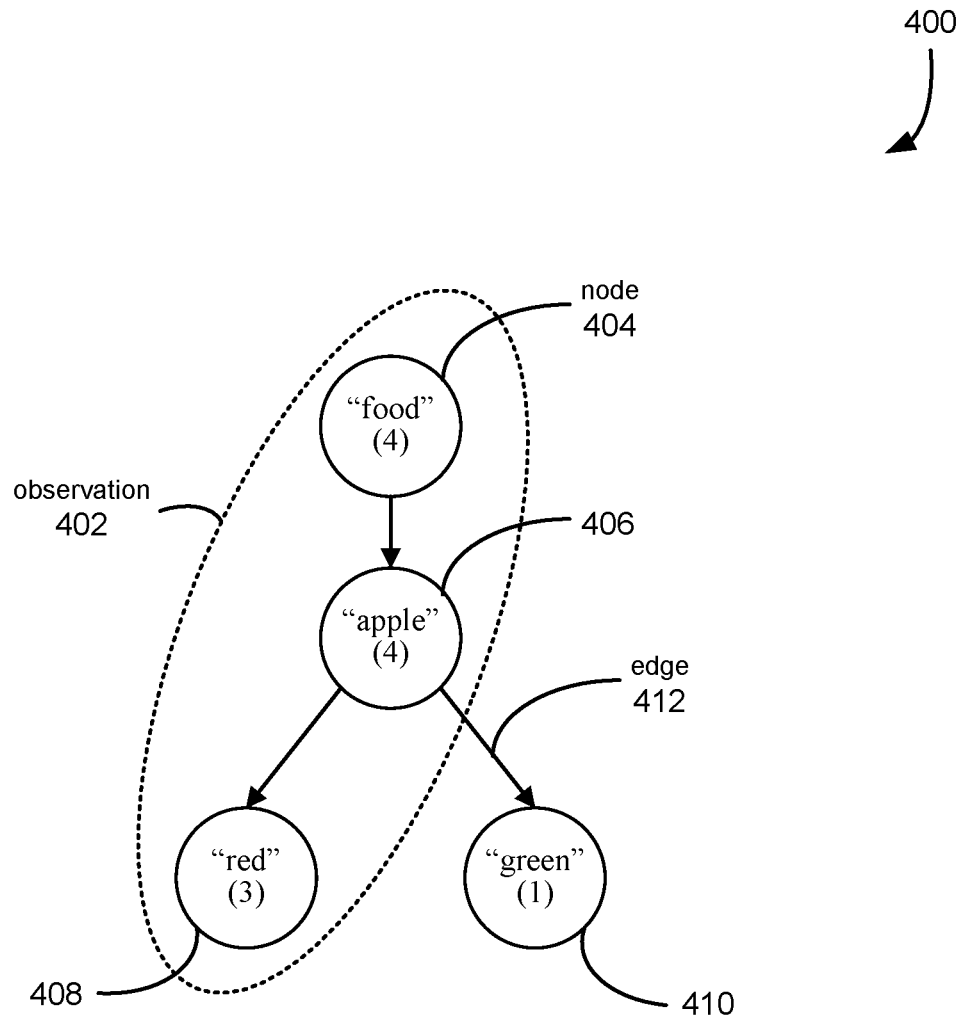
FIG. 4 illustrates a graph-based representation of observations, in accordance with at least one embodiment.

As depicted in FIG. 4, a graphical model 400 can be constructed from one or more observations read from a stream of observations. The graphical model 400, which may sometimes be referred to as a graph or tree, can be built dynamically as observations stream into a graph-based novelty detection system. The graphical model 400 may, in at least one embodiment, take the shape of a tree-structured graph. As each observation streams in, the system traverses from a root node defined by the context name to subsequent children based on the content of the observation. Thus, for each observation, a path is traversed through the tree which is defined by that observation's components. For example, for an observation ["food," "apple," "red"], the system might traverse a path defined by nodes 404, 406, 408 representative of the components "food," "apple," and "red."

The process of traversing through the graph may be described herein as an observation traversal, or as traversing an observation. For example, the observation ["food," "apple," "red"], may be traversed when the system follows a path defined by nodes 404, 406, and 408 of FIG. 4.

In at least one embodiment, as the system traverses a path through the graph 400, it creates nodes to represent any observation components not yet encountered, and creates one or more edges 412 to link the new node to successor or predecessor nodes. An edge comprises information which links nodes together and allows the system to traverse between nodes linked by an edge. Each node may comprise the categorical information associated with the component, and a counter that indicates how many times the component has been observed in that position of the observation.

In at least one embodiment, as the system traverses a path, it increments a counter in a node if the observation component corresponding to that node had already been added. For example, if ["food," "apple," "red"] has been observed three times, the system might process a fourth observation by incrementing counters on the nodes 404, 406, and 408, representing the "food," "apple," and "red" components. The observation 402 is then represented in the graph as the nodes 404, 406, 408. Similarly, if ["food," "apple," "green"] were to be observed, the system would increment the "food," "apple," and "green" counters in the nodes 404, 406, and 410. These nodes 404, 406, and 410 would therefore represent this ["food," "apple," "green"] observation, as well as any prior observations whose components are all the same value.

More generally, a node in the graph 400 includes a counter that represents the number of times the node has been traversed by current and prior observations. In at least one embodiment, if two observations with the same component value in the same position also have all the same value for the components which precede that component, then the same counter will be incremented twice. However, if two observations have the same component value, but with different preceding components, then two separate nodes will be used at different positions in the tree, where each position corresponds to the respective node's preceding components.

Figure 5:
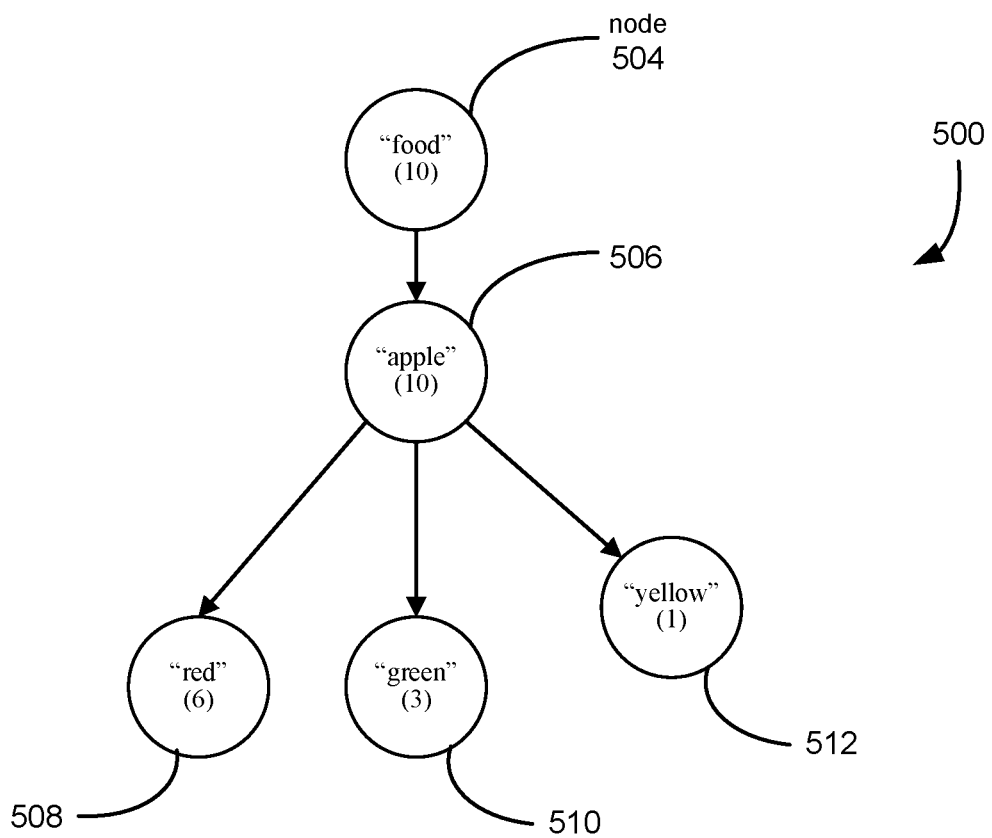
FIG. 5 illustrates an example of a graph state, in accordance with at least one embodiment.

This may be further understood in view of FIG. 5, which illustrates an example of a graph state, in accordance with at least one embodiment. The example graph 500 depicts a total of ten observations, six of ["food," "apple," "red"], thee of ["food," "apple," "green"], and one of ["food," "apple," "yellow"]. Accordingly, the counter value of node 504 is ten, to indicate that a total of ten "food" observations have been made. The counter value of node 506 is also ten, because all ten of the observations have been of apples. However, the node 508 representing the "red" component has been incremented to 6, the node 510 representing "green" to three, and the node 512 representing "yellow" to one.

Figure 6:
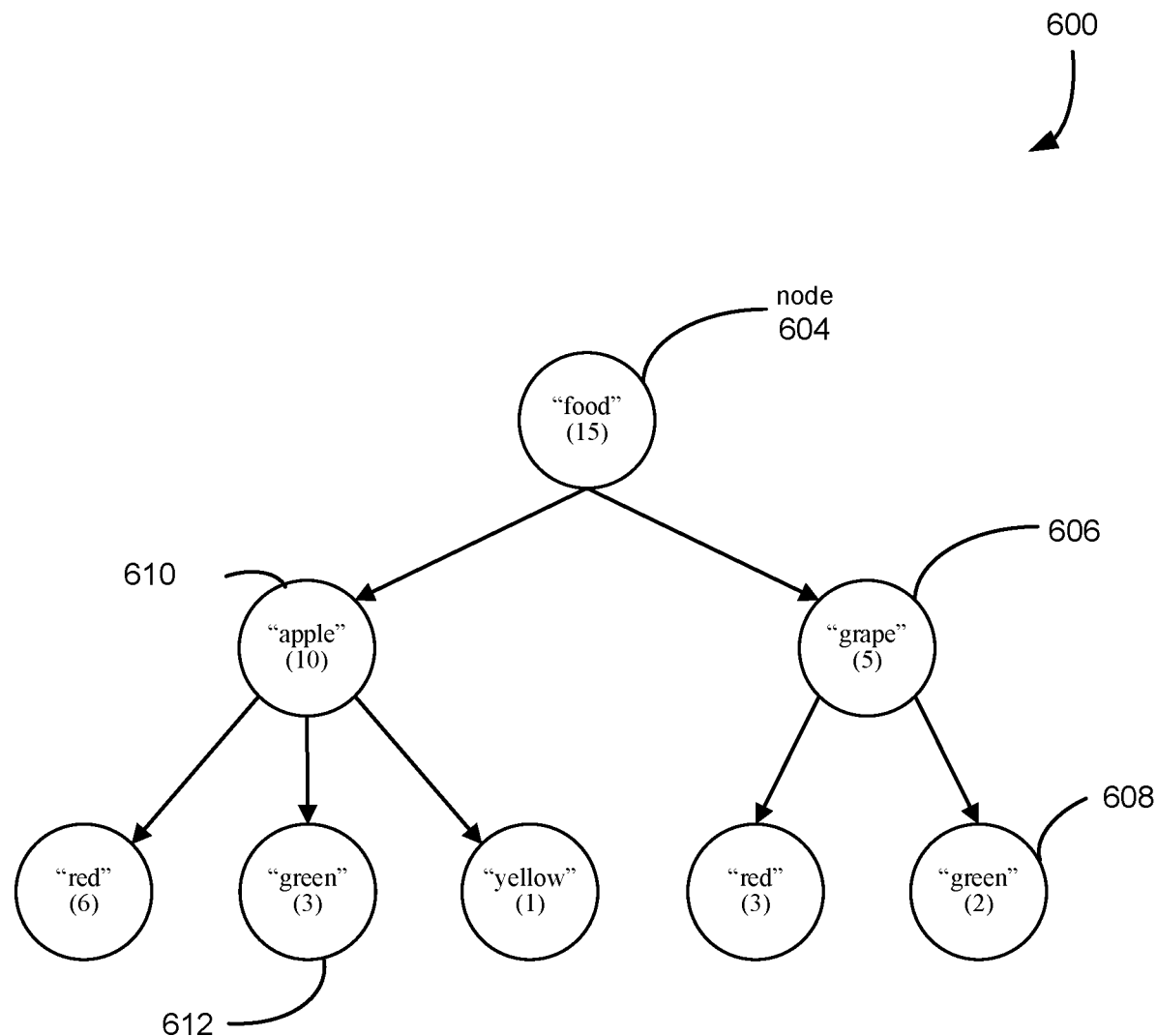
FIG. 6 illustrates a further example of graph-based representations of observations, in accordance with at least one embodiment.

FIG. 6 illustrates a further example of graph-based representations of observations, in accordance with at least one embodiment. In FIG. 6, the example graph 600 represents observations grouped into a "food" context as represented by the root node 604. In this example, the representations of observations such as ["food," "apple," "green"] and ["food," "grape," "green"] diverge beyond the root node 604. This is because the system, since the second components of these observations ("apple" and "grape") 606, 610 are not equivalent, adds distinct nodes to represent these components. Furthermore, the node 612 that represents the "green" component of the "apple" observation is distinct from the node 608 that represents the "green" component of the "grape" observation. This allows the respective counters of these nodes to be incremented separately, so that the node 612 can represent the occurrence of green apples in the stream of observations, and the node 608 can represent the occurrence of green grapes.

In at least one embodiment, nodes in a graph, such as the graphs depicted in FIGS. 3-6, are created as needed. The tree structure may therefore grow as previously unseen observations stream in. This tree represents a compressed generative model of the dataset that has streamed into the system up to the current time, in which the counters on each node of the tree represent the statistical distribution of the values in the dataset.

In at least one embodiment, an update to a graph state can include operations in addition to those related to a new observation. In addition to updating the graph state, the system may, as it traverses through the graph, collect various facts about the model at that moment. In at least one embodiment, the graph takes the form of a tree, and may sometimes be referred to a context tree. This data can include the counter(s) at each node, as well as other structural information about the graph, such as the number of alternate values seen for each component, e.g., how many siblings each component in the tree has. In at least one embodiment, these facts are collected after the update to the relevant portions of the model have been made for each component, but not necessarily before all modifications for the whole observation have been made. Embodiments may control this process so that the concurrent and asynchronous operations on the model do not result in race conditions or incorrect values due to concurrent updates and reads.

In at least one embodiment, facts from the model are collected together during observation traversal and delivered as a package for post-processing after the observation traversal completes. Observation traversal refers to the system navigating a graph based on components of the observation, as described in more detail in relation to FIG. 4.

Facts collected during this phase may represent the state of the relevant portions of the model at the point in time desired for scoring the observation. Computation may then be done outside of the graph to estimate the novelty of the observation, among other possible determinations.

In at least one embodiment, various types of information may be obtained during an observation traversal or through subsequent processing.

In at least one embodiment, the system provides information describing the observation itself. This can include a vector, array, or list comprising the observation's textual elements.

In at least one embodiment, the system generates a novelty score to indicate, in total, how novel the observation is. This value, in at least one embodiment, is between zero and one, where zero indicates that the observation is entirely normal, and one indicates that the observation is highly novel or anomalous. In at least one embodiment, the score is a result from a complex analysis of the observation and other contextual data. Further, the score may be weighted primarily by the novelty of individual components of the observation. Real-world datasets may often see this score weighted with exponentially fewer results at higher scores. In some embodiments, this may mean that 0.99 is a reasonable threshold for finding only the most anomalous results, and 0.999 may return half as many results. However, these thresholds may vary considerably based on implementation and on the type or content of the dataset.

In at least one embodiment, the system generates a different type of score, which may be referred to as a total observation score. While the novelty score field described in the preceding paragraph is biased toward novel components, the total observation score is a similar computation but applied to all components of the observation. The total observation score may be useful for finding anti-anomalies, meaning data which is very typical.

In at least one embodiment, the system generates a unique sequence number of an observation. Each observation passed into the system may be given a unique sequence number that represents the order of the particular observation with respect to other observations. The sequence number may be used, in embodiments, to explore data as it was at the time of a particular observation.

In at least one embodiment, the system generates a probability value, that represents the probability of seeing an observation in its entirety, given all previous data up to the point in time at which the observation was received. In at least one embodiment, this probability value is computed as a measure of a probability of a given observation given all previous observations.

In at least one embodiment, the system generates a uniqueness value. This is a value between zero and one which indicates how unique the entire observation is, given all previously observed data. In at least one embodiment, a value of one means that the observation has never been seen before in its entirety, and values approaching zero mean that the observation is very common. Uniqueness may be used to infer the amount of surprise or novelty represented by a particular observation. If the observation has not been seen before, in its entirety, its uniqueness will be 1. This value is calculated by measuring the total information content for the observation and dividing by the maximum possible information content at this point in the stream.

In at least one embodiment, the system generates a value to indicate information content, which can sometimes be referred to as Shannon information or self-information. Here, information content refers to information contained in the entire observation, given all prior observations. This value may be measured in bits, and is related to the question of on average, how many answers to yes versus no questions would be required to identify an observation, given all previous observations made by the system.

In at least one embodiment, the system generates information indicating which component within an observation was most novel, relative to other components in the same observation. This information might be provided as a data structure with index, value, and novelty fields. The index field is a number representing which of an observation's component is the most novel. The value field is the value of that component. Finally, the novelty is an abstract measure of how novel this particular component is. In at least one embodiment, the maximum theoretical value of this field is equivalent to the value of the information content. However, this field does not directly measure information content, and is weighted by additional factors. The ratio of novelty over information content will be between zero and one, and will explain how much of the total information content is attributable to this particular component.

Figure 7:
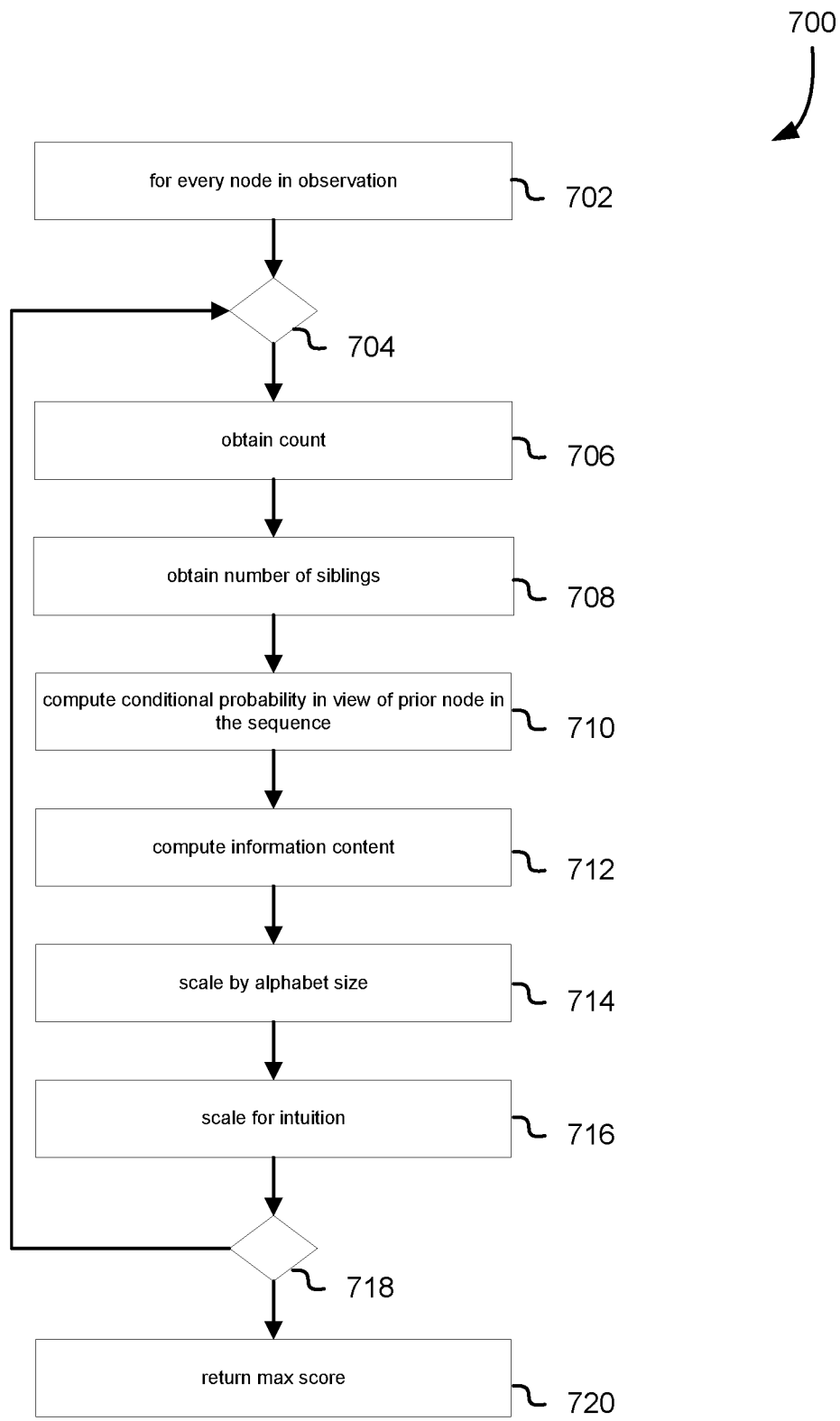
FIG. 7 illustrates an example procedure for calculating a novelty score, in accordance with at least one embodiment.

FIG. 7 illustrates an example procedure 700 for calculating a novelty score, in accordance with at least one embodiment. Although FIG. 7 is depicted as a sequence of elements, it will be appreciated that embodiments may deviate from the depicted sequence. For example, embodiments may not necessarily perform all of the depicted sequence, and may perform operations in an order other than what is depicted, except where explicitly stated or logically required. The operations depicted in FIG. 7 may be performed by any suitable system, including embodiments of the computing devices depicted in FIGS. 1 and 2, as well as by other systems, such as servers, smartphones, tables, Internet of Things ("IoT") devices, application specific integrated circuits ("ASICS"), and so on.

A novelty score is an objective, deterministic measure of how novel an observation is, given previous observations in the same context. The novelty of an observation may be calculated as the novelty of its most novel component. In at least one embodiment, to compute the novelty score for an observation, we compute the novelty for each component and then take the highest novelty value.

In at least one embodiment, a novelty score is calculated by visiting each node in an observation to collect information. At 702, the system begins an iteration of each of the nodes associated with an observation, and the operations described in relation to elements 704 and 718 are repeated for each of these nodes. In at least one embodiment, the system identifies the relevant nodes by traversing a graph from its root to the last component of the observation. For example, with reference to FIG. 4, the observation ["food," "apple," "red"] might be traversed in the depicted graph 400 by visiting the root node 404 representing "food," traversing to this node's child node 406 representing "apple," and then traversing to the child node 408, representing "red."

At 706, the system obtains a count, from the current node, of how many times the corresponding component has been observed. For example, referring to FIG. 4 and for the observation ["food," "apple," "red"], the system may observe that "food" has been observed four times, "apple" has been observed four times, and "red" has been observed three times.

At 708, the system obtains a count of the number of siblings of the current node. For example, regarding the graph state depicted in FIG. 4, the system would determine that "red" has one other sibling "green."

At 710, the system computes a condition probability in view of the prior node of the sequence. Conditional probability refers to the likelihood of an event occurring in relation to other events. Here, the system may calculate the conditional probability of the current node's component in view of the component of the prior node.

At 712, the system computes information content associated with the current node. In at least one embodiment, the novelty of a component is determined in accordance with the ratio of a component's relative information to its maximum relative information. Relative information is introduced to refer to the quantity measured by computing the information content for a component using its conditional probability with a variable logarithmic base determined by the number of alternate possibilities for that component value. Thus, at

714, the system scales by alphabet size. This create a measure of relative information. While information content can be measured in bits using the negative log-base-2 of the conditional probability, embodiments of the system instead measure the relative information of a component by using a logarithm base equal to the number of values that have occurred for that component, given the same prior observation component values. For example, referring to FIG. 6, if the model has seen a particular component take on three values, as with the "red," "green," and "yellow" apples, with all earlier components being equal, the relative information would be measured as the negative log-base-3 of the conditional probability of that component. This has the effect of weighting the information by the number of alternate possibilities.

At 716, the system scales for intuition. This refers to adjustments to the score to improve its understandability. For example, the score may be scaled so that its distribution tends to skew towards 1. In at least one embodiment, a weight is applied to the relative log base to reduce its effect on the final result. This weight can be adjusted with values derived experimentally. Using weighted relative information has the effect of defining a calculation for novelty that produces a high novelty score for surprising observations when there is a well-established set of values seen for that component, and a lower novelty score in proportion to how often new values are seen for that component. A net result of this method is that observing a new observation when new observations are common yields a low novelty score, but observing a new observation when new observations are rare produces a high novelty score. This can be advantageous, since it helps distinguish between observations that are new but nevertheless typical, and observations which are both new and atypical.

The iteration demarcated by elements 704 and 718 continues until each node in the observation has been traversed. At 720, the system returns the maximum novelty score obtained in any of the iterations.

A total observation score may be computed using relative information for each component, as computed according to the process described in relation to FIG. 7. The system can sum the relative information content for each component to generate total observation score. Relative information content for the components is additive and can be used for an additional perspective on how novel an observation is given the previously observed dataset. Depending on the characteristics of the dataset, what it represents, and what the user desires to find when comparing an observation to others, the total observation score can be an effective measure for distinguishing novel observations.

In at least one embodiment, the novelty of each component in an observation is computed. This allows the system to explain which component has the highest novelty. Knowing which component of an observation is the most novel serves as a powerful descriptive tool for interpreting the results. For example, an interpreter of the results can look at other component values in the observation to understand the observation as a whole, and then use this information to identify which feature or features of that observation are so novel. In at least one embodiment, using numeric measures of novelty allows the system to express the degree to which a feature is unusual, further aiding interpretation of the results.

In at least one embodiment, a graph-based novelty detection system can be employed to examine historical data. This graph-based novelty detection system may be incorporate aspects of a graph database or streaming graph interpreter, as described herein, to query back in time and obtain inferences relating to novelty that are applicable to a desired timeframe.

In at least one embodiment, time in a graph-based novelty detection system is measured in terms of a sequence number incremented once for each new observation that updates the model. When a new observation updates the model, the sequence number is incremented by one. That sequence number is used when storing updates to each of the nodes in the model.

In at least one embodiment, to query observations and evaluate novelty, the system allows specifying a time in the past that is used for resolution of a query. For the system, this allows the generative model to be rewound to an earlier point in the streaming ingest to see what the model looked like at the indicated time. Using this capability, the system can continue to ingest data, update the model, but still support evaluating the novelty of a previously scored observation, as that observation would have been scored at the specified time. The system therefore permits a user to investigate in view of the historical moment when an observation had just arrived. This allows the user to understand the state of the model, and correspondingly, the streaming dataset, as it was at that moment in time. At the same time, new data may be continually added to the system without affecting or being affected by the investigation of a past moment.

Some categorical values, like file paths or URLs, can be evaluated as not just a single value, but as a sequence of values. For example, in the case of a file path, splitting on path separators can turn a file path into a sequence of subdirectories. This splitting of a value into a sequence may be useful for cases such as behavioral fingerprinting, where a user wants to understand typical behavior of a program in a system as measured by the files, in nested subdirectories, that program reads and writes. However, doing so splits the input observation into data that has no fixed canonical length. For example, in the case of a file path, the more subdirectories involved, the longer the observation will be. In at least one embodiment, a graph-based novelty detection system scores variable length observations in a manner that accommodates observations that change their length from one observation to the next.

In at least one embodiment, to support variable length observations and perform score calculations, a graph-based novelty detection system uses two different counters per node. These may be described as a continuing counter and as a terminating counter. These counters are maintained separately and combined together when needed. The continuing counter is incremented when an observation traverses any node which is not the final node in the sequence. Otherwise, the terminating counter is incremented. Maintaining these two counters allows embodiments to distinguish between two observations that follow the same path up to a point, but where one of them continues further. Both counters may be read during the fact collection phase and used in the final score calculation phase. In this phase, the different counts are used to judge the corresponding graph structure (e.g., a continuing counter can be treated as an additional sibling), and with respect to the frequency of occurrence for that kind of observation, and used to calculate the final scores.

In at least one embodiment, when an observation streams into the graph-based novelty system during the model maintenance phase, its graph state, which may sometimes be referred to as a graphical model, or as a model, is updated with edges that connect nodes representing adjacent components in an observation. This is done with an outgoing edge from the earlier component, a parent node, to the next component, a child node. These outgoing edges may be counted to determine the number of siblings the child has. This strategy works well for counting siblings and also makes visualizing the model easy because any node can follow the corresponding edge to find its parent or children. When a component has many different successor component values, given the same preceding components, it may be described as having a high cardinality.

However, when a node has high cardinality, it may impose limitations on the system. For example, when a node has cardinality in the tens or hundreds of thousands of possible values, the computation time used to maintain that node (e.g., save and load from disk, perform the edge lookups, and so forth) grows large, as does the time used for fact collection. This can slow down ingest speeds as the dataset being scored grows larger. To avoid this problem, embodiments of a graph-based novelty detection system may monitor the sizes of the edge collections on each node and transition to a high-cardinality mode when the edge collection size passes a predefined threshold. From this point on, the system can operate that particular node in a high-cardinality mode.

In at least one embodiment, when a system transitions a node into a high-cardinality mode, it no longer maintains the node's edge collection that points to its children. Instead, the system maintains (e.g., in the node), a counter of how many children the node has. That counter is incremented, or decremented in some circumstances, by the children nodes of the high-cardinality node. When a child node's counters' combined total changes from zero to one, the child node instructs the parent node to increment its child count. This may be done, in embodiments, through message passing or callbacks. If the child node's counters combined total moves from 1 to 0, in the case of subtracting observations, then the child node instructs the parent node to subtract one from its child counter. In other cases, the child node can simply acknowledge that no change is needed, so that the parent node can continue processing messages. Note that the parent node may wait for confirmation from the child before processing the next observation in its queue, in order to maintain model integrity. A parent node can still relay an observation to the child node during the model maintenance phase even without an edge recording the proper child node's ID. This may be achieved by using one of the following strategies: First, the system may derive the node IDs by deterministic hashing of the context plus the path to the node in the observation. Second, somewhat similarly, the system may define the ID of the node as the sequence of component values that uniquely specify the path to the correct child node in this context.

In at least one embodiment, when a child node receives a message from a parent node that is in high-cardinality mode, the child alters its incoming edge, from the parent, to save that information about the node ID of the parent as a special local property on the child node instead. Doing so allows the child node to always know how to find its parent node. This enables visualizing the chain of nodes that represent an observation, by drawing, in a visualization, an edge to the parent using this special property on the child node.

Accordingly, in at least one embodiment, a graph-based novelty detection system determines that cardinality of a node of the plurality of nodes exceeds a threshold level, and in response to the determination, replaces one or more edges of the node with a counter indicative of a number of children of the node. In at least one embodiment, the identifiers of the child nodes are derivable based, at least in part, on path information associated with the node.

In at least one embodiment, a graph-based novelty detection system supports subtracting or removal of a previously ingested observation. When a new observation is scored in the graph-based novelty detection system, the system may increment counters on the appropriate nodes during a model maintenance phase. However, under some circumstances, it is desirable to back out or reverse an observation and remove its contribution to the model. This may be referred to as subtracting the observation.

In at least one embodiment, to subtract an observation, a copy of the observation is supplied to the system, with additional data or instructions to indicate that the observation should be subtracted from the model instead of added. The system handles subtraction similarly to addition, except that a net effect of subtraction is decrementing counters on the relevant nodes instead of incrementing them.

In at least one embodiment, a graph-based novelty detection system supports concurrent updates to a single model shared across multiple instances of the system. Although embodiments of the disclosed system may achieve very high throughput and low-latency on a single machine, or may be scaled by splitting the input stream and operating otherwise independent instances, there may be cases where it is useful to maintain a single model shared across multiple instances. In those cases, embodiments of a novelty detection system may be configured to conform to conflict-free replicated data types ("CRDTs"). CRDTs are a technique for performing certain mathematical operations in a distributed fashion. In at least one embodiment, conformance to the CRTD model is implemented by a log of updates that is maintained so that multiple logs can be combined in any order to eventually arrive at the same answer. In at least one embodiment, an event sourcing model is used.

In at least one embodiment, the counters are maintained in such a way that additions, subtractions, and other updates, such as setting properties or marking a model branch for special interpretation, can be done on separate machines and then combined together. This may be done by a process that operates on the model which, when commanded by a user or another machine in the cluster, will aggregate the local propagated changes and send them to the other systems to be combined into their respective portion of the model. Similarly, the machine in question may also receive updates from other systems in the cluster and update its own portion of model. In this fashion, a cluster of systems can process observations independently and combine their respective model results so that all cluster members share the same eventually-consistent model.

In at least one embodiment, a graph-based novelty detection system includes support for scoring hypothetical observations. A hypothetical observation is an observation that can be processed and scored by the system in any of the various ways described herein, but in which the underlying model is not actually changed in view of this observation. For example, the observation may pass through the underlying model as normal, but without creating any additional nodes or incrementing any counters. Instead, fact collection is augmented to appear as if the counters had been updated for this observation. The system then computes a score as if this observation had been recorded in the underlying model, but without actually updating the underlying model. This support for hypothetical observations allow a user to ask the system how unusual it would be to receive a particular observation, without requiring the event underlying the observation to have actually occurred, and without changing the underlying model.

In at least one embodiment, a graph-based novelty detection system includes support for predicting observations. For example, the system may include support for predicting the novelty of a future observation, based on an assumption that previously seen data should be used as a measure of likelihood for a new observation.

In at least one embodiment, to compute the predicted novelty of an unseen observation, the model update phase is skipped entirely, and the fact collection phase is augmented. This process is similar to what was just described in relation to hypothetical observations, but includes several distinctions. In at least one embodiment, during fact collection for each component, the system synthesizes an additional sibling to represent an unseen value at that position in the observation. The system treats this as a pseudo-node that doesn't exist in the underlying model, but includes consideration of its features during the fact collection phase, as if the pseudo-node was part of the underlying model. For example, the system may count the pseudo-node as an additional sibling when it counts the number of children in a parent node. Further, the system may synthesize counters for the pseudo-node based on properties of its sibling nodes, by setting the continuing and terminating counters on the pseudo-node to the value of the number of siblings which have positive net counters of the corresponding type. If a pseudo-node has 6 siblings, and five of those siblings have zeros for their net terminating counter, then the pseudo-node will have a terminating count of 1. If all six siblings have non-zero values for their net continuing counter, then the pseudo-node has a continuing count of 6. The pseudo-node's counters are included in the totals just like regular nodes. These pseudo-counts represent the missing mass of the predicted distribution of values for the component in question. This process may then be repeated for each component in the predicted observation. The value of the component being considered in the predicted observation is checked against the facts collected for that position in the model. If the value is present in the model, then the counters for the corresponding node are used. If the value is not present in the model, then the counters for the pseudo-node at that position are used. The system can then perform novelty calculations, using for example the techniques described in relation to FIG. 7.

In at least one embodiment, a graph-based novelty detection system allows sections of the model to be marked for special classification or handling. For example, if a graphical novelty system is being used to monitor computer systems for cybersecurity threats, a user might know of certain observations that represent malicious behavior, such as observations that represent known indicators of compromise ("IOCs"). In these cases, the user may not want to wait for a model to be built and observations scored before they mark that possibility as a special case.

In at least one embodiment, a graph-based novelty detection system supports user annotations on specific components, or sets of components. In at least one embodiment, these annotations take the form of a set on arbitrary nodes. This approach can be used, in some embodiments, even if those nodes have not been observed before. When those nodes are visited to collect facts, these additional annotations are also collected, and used during score calculation.

In at least one embodiment, the system may interpret a flagged node to ensure that a maximum novelty score is returned when an observation includes that node, and the explanation for its most novel component may point to the annotated node and describe the node's annotations. Nodes may also be marked as being weighted more or less based than they would ordinarily. For example, a user might indicate that a particular observation represents a suspicious activity, and in response the system might annotate components of that observation with additional weight, causing their novelty scores to be affected correspondingly.

In at least one embodiment, a graph-based novelty detection system includes support for complex routing functions. An observation moves through the underlying model structure, creating new nodes as needed, based on the value of the next observation component. If this value has already been seen at that position, the observation is routed to the node that represents that exact value. If that exact value has not been seen previously, a new node is created to represent that exact value. Before routing an observation to the next node, the system may apply a function to the value of the observation component. The result returned from the function may then be used to route the observation. In the simplest case, an identity function, where the same value is returned unaltered, is used. However, embodiments may employ more advanced functions. In at least one embodiment, a fuzzy match function is used to route an observation to the next node if its value is substantially similar to a previously seen value. In another example, stemming of natural language words is used to remove distinctions between plural or singular nouns, or to unify different conjugations of a verb. In other cases, Hamming distance or Levenshtein distance functions can be used to measure the similarity of different strings. These functions can compare the value of an observation component to features in the underlying model, for example to see which previous value is most similar, and then route the observation accordingly.

In at least one embodiment, a graph-based novelty detection system, although adapted for analyzing categorical data, also include support for similar analytical goals as applied to numerical data. Although some embodiments may convert some or all numeric data to strings, and analyze the numeric data as if it were categorical data, other approaches may be used.

In at least one embodiment, for an observation that has a numeric component, the observation traverses the graph in the same, or similar, fashion as described herein, for example as described in relation to FIGS. 4-6. When the traversal reaches the numeric value, it may be relayed to a node that represents the distribution of values which this numeric component is drawn from. Using standard univariate density estimation, and/or other techniques, the node responsible for the numeric component updates the parameters of the distribution so that they reflect the data seen up to that point.

Probabilities computed for values from this distribution represent conditional probabilities, because the observation has branched on all the given values that came before it in the observation. If the preceding observations were different, an entirely different probability distribution would be learned. Embodiments may employ any of a variety of techniques for estimating probability distributions from a historical set of values, including but not limited to histograms, Gaussian mixture models, and kernel density estimators.

In at least one embodiment, a graph-based novelty detection system builds a dynamically updating model of numerical data at a given position in an observation. In at least one embodiment, the model is similar to a histogram in that the system uses the histogram to create buckets, or categories, to which numeric observations are routed. Nodes in a graph can perform arbitrary computations, which may include introspection of their respective properties and how those properties relate to the structure of the rest of the graph. This makes it possible to adjust the structure created from numerical observation components on the fly when sufficient data has been received. In at least one embodiment, when a parent node observes numeric data as the next observation element, it begins by creating separate nodes for each distinct numerical element. To route new observations to the correct node, a comparison function is applied to test which one of the ranges represented by the child nodes correctly represents the bucket to which the present observation should be routed. When sufficient observations have been made and enough nodes created in the next step, nodes representing categories of data can be merged together, their counters and edges combined, and the structure condensed. This process may be applied recursively to the child nodes as needed to merge subgraphs. This condensing process builds a compact representation of the distribution of the observed data, which may be in the form of a histogram. Calculating the probability of any given numeric observation is then a matter of computing the probability of reaching that node, given the learned probability distribution.

In at least one embodiment, a graph-based novelty detection system includes components for translating incoming data into an ordered sequence of observation components. In various embodiments, the earlier components in an observation are used as given values for later conditional probability calculations. Because of this, evaluating novelty based on a different order of components in an observation essentially asks a different question. In more formal terms, the probability of "C" given "A, then B", may be different when the order of "A" and "B" is changed:

$$P(C|[A, B])..P(C|[B,A])$$

Accordingly, the order in which observation components are considered can have a meaningful impact on the resulting score computations. An expert user or system can shape the behavior of the system in powerful ways by carefully choosing the order of the given values of the conditional probability calculation. However, embodiments of a graph-based novelty detection system may use any of a variety of techniques for learning a useful order of observation components.

In at least one embodiment, data sampling for cardinality order is employed to learn an order of observation components. Using this approach, the system arranges the input observation components in order from lowest to highest cardinality. For example, the system may provide an API endpoint which, when invoked, will learn an order based on component cardinality. In at least one embodiment, the components are arranged in order of increasing cardinality. The cardinality may be determined by empirically sampling a batch of the input data. Then, given the number of unique values seen for each field, the components are linearized and ordered by ascending cardinality.

In at least one embodiment, a weighted graph modeling approach is used to determine a suitable order for the observation's components. In this case, a stream of data is read, separately from input of streaming observations, and analyzed to build a weighted co-occurrence graph to model both the cardinality and the frequency with which values occur together. By building a model of all values seen in a sample of data, counts on edges connecting co-occurring values can be used to weight the edge and allow for analysis of the graph to determine how to order the components and to determine which values should be modeled with joint probability instead of conditional probability. In at least one embodiment, joint probability is modeled by concatenating two or more components into a single component with a deterministic order.

In at least one embodiment, a learning-by-example approach is used to identify a model that has a suitable order. Note that although novelty may be treated as an objective feature of an observation, users may seek to obtain more subjective inferences from a novelty detection system. For example, what qualifies as anomalous is often what would be considered suspicious or malicious, even if the observation to which these terms was applied isn't strictly novel in the mathematical sense. Accordingly, in at least one embodiment, a graph-based novelty detection system is configured to include the ability to adapt possible computations of novelty to fit more subjective determinations of novelty. Using this approach, data may be fed into the system until it has learned a representative sample, and then the user provides one or more example observations they expect to be scored with high novelty. The system then learns, using one of a number of possible approaches, to analyze observations in a manner which would tend to call out similar observations as novel.

In at least one embodiment, a plurality of models are searched to find one whose ordering of observation components produces results that best align with the user's expectations of what should be considered novel. In at least one embodiment, the system orders incoming observation components multiple times to create many different models for the same data. For example, the system might create one model for each of several potential orderings. Because a graph-based novelty detection system may support concurrent high-throughput observations, and a single stream of observations can easily be ingested into many such models. In at least one embodiment, when the user provides a known-anomalous example observation, that observation is read from each model, and the resulting values, such as the score or total observation score, are examined to determine which model best identifies the example observation as anomalous. The observation component order taken from this model can then be used to process incoming data, and other unused models can be pruned from the system.

In at least one embodiment, a technique, which may be described generative model adaptation via graph analysis, is used to find an ordering of incoming observation components that best aligns with a user's expectations of what should be considered novel. Using this approach, the system builds a single model using any observation order, and then analytically solves for which alternative order would have produced the highest score, given an example observation. In at least one embodiment, this is done by calculating conditional probabilities for components which would have been arranged differently in the structure of the underlying graphical model. This process may be aided by recording edges from component values to the same value in other branches of the tree-like graphical model so that the system can quickly count how many times that value has appeared in total. Computing alternate conditional probabilities and corresponding model structure for each component in the provided example of novelty is, in at least one embodiment, sufficient to compute all the score values from a single generative model. The scores generated in this manner can then be analyzed by the system to determine which component order best identifies the given example as being novel. Finally, the existing generative model can be restructured to in accordance with the newly learned order.

In at least one embodiment, a graph-based novelty detection system supports novelty detection performed over a moving window of observations. In at least one embodiment, this is done by leveraging an embodiment's ability to subtract observations from a model. For example, in some scenarios it may be preferable to use a model that reflects only recent events, instead of all observations since the model was created. In at least one embodiment, to score results based only a recent window of observations, an additional queue is maintained, into which observations are added after being fed into the rest of the novelty scoring system. This queue is a first-in, first-out ("FIFO") queue so that when it is full, results are expired in the same order that they were added. When a result is expired from the queue, it is removed from the queue and subtracted from the model. A subtracted observations no longer contribute to the model or impact novelty scores. The net result of this strategy is that the queue represents a sliding window through time and a new observation is scored based on a sliding window that corresponds to the observations in the queue at that time.

In at least one embodiment, a graph-based novelty detection system is configured to provide capabilities based on monitoring novelty scores generated in association with an incoming stream of observations.

In at least one embodiment, a graph-based novelty detection system monitors novelty scores to determine when a model has acquired a representative quantity data samples, and as such has become capable of generating results which are both mathematically correct and useful.

In at least one embodiment, a graph-based novelty detection system is unsupervised, meaning that the system does not need labeled training data to learn from before it can be used. Instead, the system outputs results that are technically (e.g., mathematically) correct as soon as more than one observation has been processed. In real-world applications, however, these earliest results are not useful even if they are correct. This is because an embodiment may score observations based on whatever observations came before them in the stream of ingested data. Until the system has read a representative sample of data from the stream, the results may not be of much practical value.

Accordingly, in at least one embodiment, scores being returned from the streaming system are monitored by the system to observe their variation. As more data streams in, score variation typically declines because the system is learning what is normal for that given dataset. By monitoring the change in scores over time, the system provides a practical signal to indicate when enough data has been seen to produce results likely to be considered useful. In at least one embodiment, the system generates a notification when this variation falls below some threshold level.

In at least one embodiment, a graph-based novelty detection system monitors outgoing scores to analyzes and identify behavior that is occurring in aggregate over a period of time or over some particular number of observations. For example, a high-scored observation which is soon followed by more of the same observation so that their scores quickly drop represent the beginning of a new trend which might eventually be considered normal. Conversely, a high-scored observation which remains high-scored after some additional number of observations or amount of time passes may represent a genuine outlier over a period of time, instead of just being an outlier at one point in time. In at least one embodiment, embodiments detect and identify patterns such as these and generate notifications to indicate that they have occurred.

In at least one embodiment, the monitoring capabilities just described can be achieved using standing query capabilities. For example, the monitoring capabilities just described by be implemented by setting up a query subscription which, in turn, feeds an outgoing stream.

In at least one embodiment, a graph-based novelty detection system includes components to perform transforms on ingested data. In at least one embodiment, this is done using a generalized transform-on-ingest capability. The transformation may be expressed as a function in a query language, such as Cypher, or a general programming language, such as JavaScript, and applied to incoming data before this data is evaluated for scoring. In at least one embodiment, this process includes validation steps.

In at least one embodiment, a graph-based novelty detection system may include transformation capabilities related to bucketizing observations, such as numeric observations, into categories. For example, when numeric values appear in the incoming data, it may be helpful for the system to translate these numbers into categorical values. This may be desirable for real-world data in which the precise value is less important than the range in which the value falls in. To illustrate, latency measurements are often recorded with numeric values in milliseconds or seconds. However, it is sometimes the case that minute differences in numeric values are less useful than more easily interpreted values such as "fast" or "slow." Accordingly, embodiments may provide capabilities for translating between numeric values and bucketized categorical data. To make this process convenient, a transformation on ingest capability, as the one described in the preceding paragraph, may be used to apply a transformation function to an incoming numerical value and transform the value into a categorical strings.

In at least one embodiment, a graph-based novelty detection system provides support for read-only observations. Here, a read-only observation is one in which an observation is provided and analyzed for novelty (e.g., to produce a novelty score), but the observation does not result in the model being updated. This means that a user can query the novelty system with an observation at any point and read out the score of that observation given the state of the underlying model, without causing the model to change.

In at least one embodiment, a graph-based novelty detection system is capable of generating novelty scores that are applicable globally or locally. A global score is a representation of how likely this particular observation is as a whole, given all the previous observations made by the system within a particular context. Techniques for calculating a global score are described herein, including with respect to FIG. 7. A local score is a representation of how likely an observation is within some subset of an observation. A local score may be useful for including only the relevant context into the calculation of novelty or anomalousness. While the global score is informative over every single previous observation, the local score is a measure of what is typical for nearby context.

As an example, a local score may be used to generate a "fingerprint" of typical activity done by many different processes in a running computer system. In at least one embodiment, files read and written by a process on a running computer system generates a stream of observation data. Each observation in this stream could be made to include a process name, access type, and elements of the file path elements. For example: ["browser.exe," "read," "/," "home," "user," "desktop," "secret.txt"]. This observation corresponds to the event of browser.exe reading the file secret.txt from a user's desktop. It may be quite common for browser- .exe to read or write files from some directories but not others. Some processes, for example, often write temporary files with never-before-seen file names. Learning that this kind of activity is normal for some processes and not others provides more meaningful novelty scores than systems that are incapable of making this distinction. Accordingly, a local novelty score might determine that activity within the subcontext "\data\temp" is typically normal, while activity within the subcontext "\user\desktop."

In at least one embodiment, a graph-based novelty detection system is useful for answering questions beyond the novelty scoring of input data. The graph structure itself may represent a compressed, probabilistic model of the dataset used to generate it. This model can be queried to return values that correspond to specific requests.

In at least one embodiment, a graph-based novelty detection system allows a graph to be queried to produce an observation determined to be most likely, by traversing the graph along the path with the highest counts at each step. The data obtained from this traversal may correspond to the observation that is most likely. Similarly, in at least one embodiment, the system allows the graph to be queried to identify the least likely observations. In other cases, requests can made at specific points in the graph to return probable observations, and report on the probability calculation of a localized section of the graph. Given the example of observing file access by computer processes described above, one example of the utility of this mechanism is for answering questions about how one particular process behaves, or how all processes behave with respect to a particular subdirectory.

In at least one embodiment, a graph-based novelty detection system can be used to produce synthetic datasets which follow the same statistical patterns as the originally observed data. Each node participating the graph learned from a dataset can produce an alternate symbol according to the type of data it originally was created to represent, such as categorical or numerical data. The graph can be used to produce a new dataset built from these alternate symbols by traversing the graph from the starting node as many times as desired. To maintain the distribution of the original dataset, the nodes encountered may route the query to their children randomly, according to the probability distribution learned from the original data. The alternate symbols are collected along the way. Each traversal yields an additional datum (in this case, e.g., a vector of elements) for the new synthetic data set. The resulting dataset will have the same statistical properties as the original dataset but with different values at each position. In at least one embodiment, this generative method for producing synthetic data is an effective way to anonymize a dataset.

Embodiments of the present disclosure may be implemented using a node-centric architecture, as described in more detail below. In such systems, a node serves as a primary container of data in a graph model maintained by the system. Connections between nodes are represented as edges. Edges may be defined logically as being rooted on one particular node and comprising a name, direction (possibly allowing for undirected edges), and the ID of another node to which the edge is connected. In some data models, it is desirable to store properties on the edge itself. For example, in some cases it might be desirable to store a numerical "weight" indicating the strength of the connection between two particular nodes.

Figure 9:
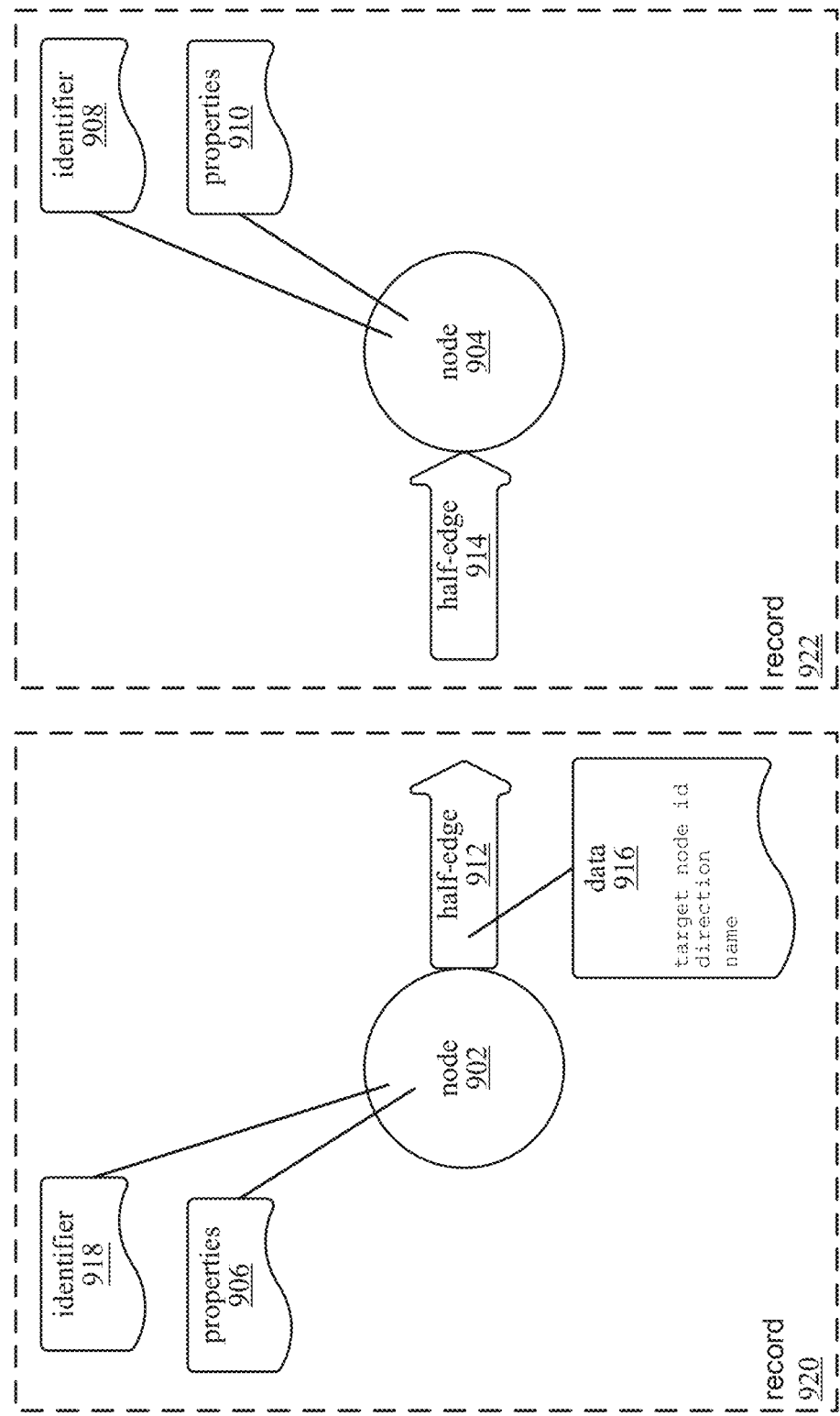
FIG. 9 illustrates an example of node data structures, in accordance with at least one embodiment.

In at least one embodiment, a node-centric architecture, as described in more detail below, and embodied in systems such as a graph-based novelty detection system or a graph database, may support various mechanisms for storing edge properties. In at least one embodiment, a node-centric architecture stores properties on a node corresponding to one side of an edge (for reference, FIG. 9 illustrates a possible node and edge representation, to which this technique might be applied). Which edge to choose may be defined by convention and shared system-wide but, in at least one embodiment, is always deterministic. For example, since the IDs of the nodes on each side of the edge may be available as part of the definition of every edge, sorting edge IDs and choosing the first item resolves the question of which node should manage the properties for that edge. Edge properties may then be stored as special properties on the chosen node and associated with the appropriate edge.

In at least one embodiment, edge properties may be stored on a pseudo-node which is not directly connected to the either of the nodes included in the edge definition. This pseudo-node may behave like a node in other respects (sending/receiving messages, storing a history of property changes, etc.), but is not included in-line in the definition of the edge. Instead, when a query requires reading or writing to an edge's properties, the definition of the edge may be used to deterministically generate a unique identifier for the edge's pseudo-node, which manages the edge's properties.

In at least one embodiment, a unique identifier may be all that is needed to uniquely address a node managing properties. A query mechanism and graph interpreter may take this design into account when determining how to evaluate a particular query. Queries that access edge properties may include an additional step to make the request to the pseudo-node managing the edge properties. Queries that use the edge for only structural or traversal purposes, and don't consider the edge properties, can ignore the pseudo-node storing edge properties entirely.

In at least one embodiment, edge properties are stored as a node, and a deterministic scheme is used to choose which side of the edge stores the property data.

In at least one embodiment, edge properties stored on an external node, the ID of which is uniquely determined by the edge definition. In this context, external refers to the node being a third node, in addition to the two nodes linked by the edge whose properties the third node represents.

In at least one embodiment, a node-centric architecture, as described in more detail below and embodied in systems such as a graph-based novelty detection system or graph database, an actor (sometimes referred to as a message processor), provides the computation for each node. Using this technique, each node may perform any arbitrary computation, as defined by the message-handling implemented on that actor. Using the generality of this computational mechanism, a node-centric architecture can provide capabilities which may improve the operation of the system.

In at least one embodiment, an actor is single-threaded and therefore processes one message at a time. However, messages can be produced into the mailbox in parallel. Under heavy load, this can cause an actor's mailbox to back up with unprocessed messages leading to a bottleneck in system performance, particularly if one actor receives a disproportionate share of message. This is prone to occur when data models contain highly connected nodes. These nodes may be referred to as supernodes. A supernode may have a disproportionately high number of edges, have a disproportionately high number of properties, and/or may receive an unusually high number of messages (often because of its position on a highly-trafficked path in the graph). Supernodes are a difficult problem for graph-structured systems because including a supernode in the process of resolving a query represents a high degree of computational complexity. When resolving a query requires traversing a supernode, that often includes the double-bottleneck of a backed-up mailbox and a high cardinality of edges to explore to determine how to route the next step in the query. Implementing a graph computation system with actors may address these problems in ways that take advantage of the specialized computation model of an actor capable of arbitrary computation behind every node.

In at least one embodiment, techniques associated with conflict-free replicated data types ("CRDTs") are used to mitigate performance bottlenecks caused by supernodes. A node-centric architecture may provide capabilities for representing certain operations on properties as CRDT operations. These CRDT operations may operate in parallel when the node is backed by more than one actor. For example, in at least one embodiment, for each type of property value stored on a node, there may be a set of operations for that type which are capable of being performed in parallel. This may be done by spawning child actors to which the incoming update messages are routed. Each of these child actors performs a parallel operation on one or more messages, then relays the accumulated results back to the parent actor. The results of these parallel computations are combined together when needed to either durably persist a record of the counter on disk, or to read the value and use it when processing a query. Parallel operations may be used to handle the bottleneck of message-processing which is introduced by a supernode present in a graph. The unique independent processing of each node backed by an actor allows the system to make decisions about performing certain property update operations in parallel by distributing update messages to ephemeral child actors spawned for this purpose, and aggregate the results together to use for query resolution and data persistence.

In at least one embodiment, supernode performance is improved using dynamic node-level indices. Handling supernodes may involve significant computational complexity due to a high number of edges, which represents a large search space when a query arrives and the system needs to determine which edge to follow to complete the next step of a traversal query. This processing may be assisted by the ability of a node to be able to perform arbitrary computations by virtue of being backed by one or more actors and by incremental computations being triggered by the arrival of new messages in an actor's mailbox. In particular, the nodes in a system can monitor the number of edges (of a specific name and direction) connected to that node. When the number of relevant edges passes a certain threshold, either defined by configuration or dynamically determined by other processes in the system, the node can initiate the creation and maintenance of a local index representing the nodes at the other ends of the relevant edges. A node that reaches, or is reaching, this state can send a message across the relevant edges to the other nodes subscribing to the values contained in those other nodes. A local index on the supernode may be built so that future queries can quickly resolve which of the candidate nodes along the relevant edge-type fit the new query. This can mitigate the computational complexity required to send additional query messages to the relevant nodes. The index may be maintained by each of the relevant nodes receiving a subscription request for its changes. When a node connected to the index-containing-supernode is updated, it reports the change back to the subscribing supernode with details of the change so that the index contained on that supernode is always kept up to date. Maintaining this index can take advantage of the multi-actor parallel processing (for example, with CRDT operations) described herein.

In at least one embodiment, supernode performance is increased by using CRDT techniques to process property updates using multiple worker actors for higher throughput of message processing.

In at least one embodiment, supernode performance is increased by generating a node-level index and using this index to perform edge traversal.

A graph-based novelty detection system may be implemented, in at least one embodiment, using a node-centric architecture. In such an embodiment, the nodes of a graph communicate via an asynchronous message-passing, and each node's messages are processed by a message processor assigned to that node. Edges in the graph are represented by specialized node properties referred to herein as half-edges. In a further aspect of this embodiment, an edge between two nodes in a graph is stored as two half-edges. The half-edges are stored with their respective nodes. The half-edges are treated as a specialized type of property, where their key is the direction and type, and their value is the identifier of a node to which the edge refers. To represent properties associated with the conceptual notion of an edge between two nodes, the system stores an additional node with corresponding additional half-edges, so that an 'edge-node-edge' pattern represents an edge with properties. The properties associated with the edge are stored with this additional node. In a further aspect of this embodiment, each node in the graph is assigned a message processor, as needed. The message processor, which may also be referred to as an actor, functions as a single-threaded, lightweight, virtual processing unit. Interaction between nodes occurs via message passing between nodes. Each node is associated with a mailbox, which may correspond to a queue structure, from which the message processor withdraws and processes messages.

In at least one embodiment, each node of a graph is uniquely identified by an identifier, comprising a sequence of bits whose length, subject to storage constraints, may be effectively unlimited. Nodes may also be identified by more meaningful types, such as via numbers, strings, universally unique identifiers, and so forth.

In at least one embodiment, a message is passed to a node using the node's identifier. Sending a message to a node that has not previously been referenced will result in an actor being assigned to that node. The example embodiment further ensures that at any one time, only zero or one message processor is assigned to a given node. Message processors that are no longer needed for processing a particular node's messages are shut down, suspended, or assigned to other nodes.

In at least one embodiment, data is stored on disk in a separate logical location for each node. Data is stored for a node as an append-only log of events representing changes made to that node, such as properties added, edges removed, and so forth. The events are stored together with a timestamp. When a node is started, a message processor is assigned to represent that node, the message processor reads the event log for that logical node, and replays the events in order, until the corresponding aggregated state of the node is reached. If no log exists, the example embodiment treats it as an empty log with no events to replay. In this way, all nodes functionally exist, even though only some nodes have a history already saved.

In at least one embodiment, a graph-based novelty detection system may leverage the ability to query historical states in the data. This is done by starting a node with instructions to replay the log until a specified moment in time. In some cases, a snapshot, also stored with a timestamp, of a previously computed state is used. The replaying of events may begin with a snapshot, which allows skipping events in the log before the snapshot's timestamp. Events subsequent to the snapshot's timestamp are then replayed up to the desired time. When the message processor backing the node reaches the specified time, it stops replaying the log and is available to handle messages, including messages related to the processing of queries. Historical states of a graph can be queried in the typical fashion by specifying the desired time in the query, and replaying each log only that far. The example embodiment thereby manages historical states so that a time the past is accessible in the same fashion as the present graph, and only the nodes required to answer a query are accessed or replayed to their historical state. In a further aspect of the example embodiment, queries that span historical ranges perform in a similar fashion such that when the desired starting time of the queries is reached during event replay, the query conditions are tested at each successive event until the replayed event's time stamp reaches the ending time from the query. The results over this period are aggregated and used to resolve the query over the specified time range.

In at least one embodiment, a graph-based novelty detection system may leverage the query capabilities built into the system. In at least one embodiment, queries that are converted to an intermediate representation for expressing queries over the graph data. The intermediate representation may comprise a tree structure. To process the intermediate representation, the example embodiment may translate the tree into a set, list, or other linear structure, and translate the structure into a result. This process is also invertible under certain circumstances such that, a result can used to produce a set, which can be used to produce a tree, which can be used to produce a graph corresponding to the query.

In at least one embodiment, the system evaluates a query by delivering an intermediate representation of the query to a selected first node. The node may be selected using an indexing technique, as described below. The node then evaluates the portion of the query represented by the root of the tree-like structure of the intermediate representation. The results of this process may determine how to process the remainder of the query. For example, the next step might be to return no results if the data on the node does not match the head of the tree, or by routing the remainder of the query to another node connected with the current node by an appropriate edge. Query evaluation may therefore be described as an iterative process of receiving the query, evaluating one step in the intermediate representation on a given node, and relaying the results and remainder of the query to the next appropriate nodes.

In at least one embodiment, queries can be issued for the purpose of extracting data, or inputting and persisting data into the system. The example embodiment may match the appropriate section of the query to existing data. For example, a command to create a specific sub-graph structure in the data begins by the system pre-processing the query to understand where that structure would semantically belong in the existing graph. A sub-graph may refer to a region within a graph, such as a subset of graph nodes that conform to a particular pattern. The system then begins at the position where the structure belongs and matches it to existing data first, creating new data where there is deviation from what already exists. This process may not require the user to know the internal identifiers used by the system. So, if a client device issues a command to create the structure: A→B→C, where A→B already exists, the system would add, to B, an edge pointing to the new node C. In the example embodiment, this semantic matching to existing data does not require using identifiers or other information internal to the system.

In at least one embodiment, a query is resolved into tree structure expressed in an intermediate representation. The structure, or a portion thereof, is delivered to each successive node. The example embodiment may store these portions, together with data received from prior processing of the graph, for later use. By persisting the query together with each node in the graph, queries can be lazily evaluated, even after long periods of time, or after interrupted execution, such as when the database is restarted. The example embodiment may support execution of a query as a standing query that is persisted in the graph in this fashion. A standing query may be associated with a callback function that includes instructions for responding to various conditions, such as where a node 1) initially matches the query; 2) initially does not match the query; 3) initially did not match the query, but does subsequent to a change to the node's data; and 4) initially matched the query, but no longer matches due to a change to the nodes data.

In at least one embodiment, with respect to a standing query, the system stores the result of each successive decomposition of a query, into smaller and smaller branches, or portions, on the node issuing that portion of the query. The query portions issued to the next node is essentially a subscription to the next node's status as either matching the query, or not. Changes in the next node's state result in a notification to the querying node. In this way, a complex query is relayed through the graph, where each node subscribes to whether the next node fulfills the smaller query. When a complete match is made, a message processor selected to handle the notification is provided with the results and the appropriate callback is invoked. These callbacks may return results, but may also execute arbitrary functionality, such as initiating new queries, or even rewriting parts of the graph when certain patterns are matched.

In at least one embodiment, the system also supports queries of a past state of the graph, by leveraging a capability to replay a node's event log up to a specific point in time. This permits a prior historical state to be queried and retrieved in the same way that the current state is queried and retrieved. In a further aspect, the example embodiment may support a query of graph patterns through ranges of history, including all time. Standing queries can be issued before node event replay occurs to effectively query throughout the entire history of the graph, or for a specific time range, to determine whether a specific query pattern ever existed in the past data.

In at least one embodiment, the basic unit of computation for the graph is the node, and the node is also the basic unit of data storage. Each node is represented by an event log. Moreover, the example embodiment may support multiple, swappable backends for storing each node's event log. The structure of this storage architecture is essentially that of a key-value store. For each node identifier, functioning as a key of a key-value pair, the backend stores the event log, which functions as the value. Depending on the storage backend, this can be made more efficient by only storing the latest event, instead of rewriting the entire event log.

Figure 8:
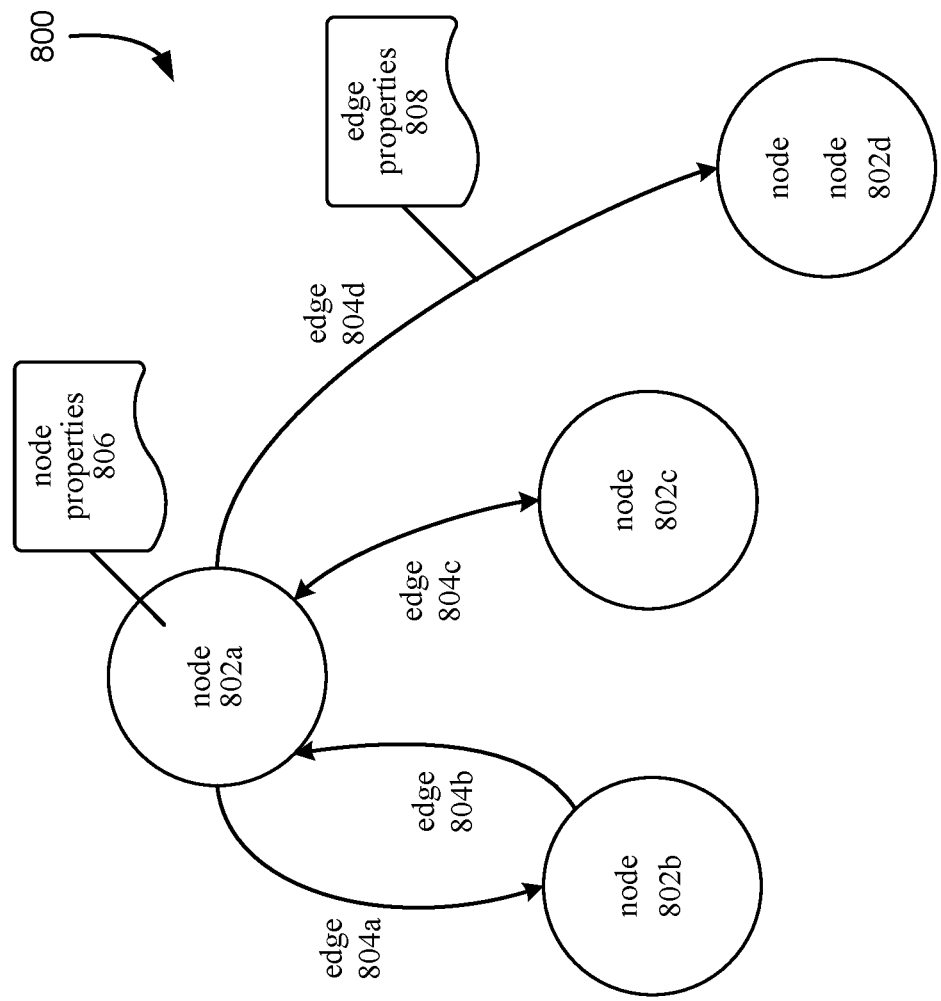
FIG. 8 illustrates an example of a graph maintained by a graph processing system, in accordance with at least one embodiment.

FIG. 8 illustrates an example of a graph maintained by a graph storage and processing system, in accordance with an embodiment. In particular, the example depicts a conceptual view of a graph 800 that may be maintained by embodiments of a graph processing system, sometimes referred to as a graph database, described herein. Embodiments of such systems may be used to implement a graph-based novelty detection system, by providing support for storing, retrieving, querying, and otherwise processing data modelled as a graph.

In the example of FIG. 8, the graph 800 comprises nodes 802*a-d* connected by edges 804*a-d*. It will be appreciated that the depicted graph 800 is intended to be illustrative rather than limiting, and as such should not be construed so as to limit the scope of the present disclosure to only those embodiments that conform to the specific example provided.

Any of the nodes 802*a-d* may be associated with one or more node properties 806. A node property includes information about the node, and in particular about the entity that the node represents.

The edges 804*a-d* describe relationships between the nodes. In at least one embodiment of a graph, an edge may be unidirectional or bidirectional. Thus, in the depicted graph, a node 802*a* is linked via a unidirectional edge 804*a* to a second node 802*b*, and to a third node 802*c* via a bidirectional edge 804*c*. This third node 802*b* is linked by the same edge back to the first node 802*a*.

Any of the edges 804*a-d* may be associated with one or more edge properties 808. An edge property includes information about an edge, such as information pertaining to the relationship between nodes linked by the edge.

FIG. 9 illustrates an example of node data structures, in accordance with at least one embodiment. For purposes of the example 900, it is assumed that a system has stored data for a graph in which the first node 902 is linked to the second node 904 via a unidirectional edge. These two nodes, and the relationship between them, is stored by the system as two records 920, 922, each representative of a corresponding one of the nodes 902, 904.

The first record 920, representing the first node 902, comprises a node identifier 918, zero or more node properties 906, and data describing a first half-edge 912. The edge data 916 may comprise an identifier of a node to which the edge refers, a direction of the half-edge 912, and a name of the half-edge.

The second record 922, representing the second node 904, may likewise comprise a node identifier 908, zero or more node properties 910, and a data describing a second half-edge 914. The data describing the second half-edge may include an identifier of the node from which the edge originates, data indicating the direction of the half-edge 914, and a name of the half-edge.

The first and second half-edges 912, 914 collectively define a link from the first node 902 to the second node 904. Note that the first half-edge 912 is stored as part of, or in association with, the record 920 that represents the first node. Likewise, the second half-edge 914 is stored as part of, or in association with, the record 922 that represents the second node 904.

In at least one embodiment, half-edges are stored as a type of property, similarly to other node properties, but allowing for many edges with the same key.

In at least one embodiment, messages are transmitted between nodes based on the half-edge information. For example, the data 916 associated with the half-edge 912 of the first node 902 may include an identifier of the target node, which in this case is the identifier 908 of the second node 904.

Figure 10:
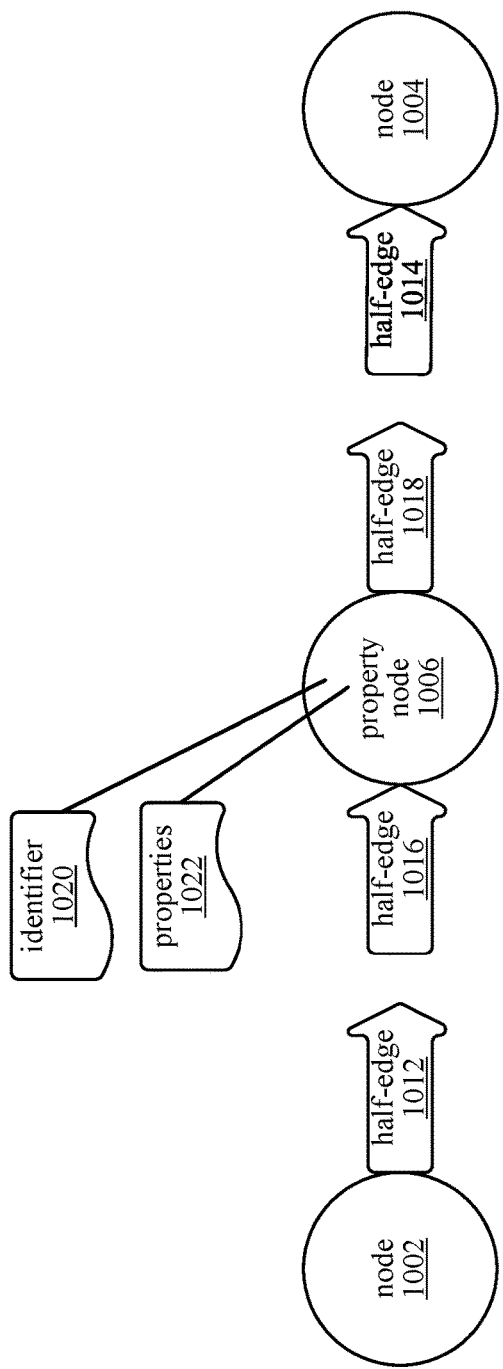
FIG. 10 illustrates an example of edge property data structures, in accordance with at least one embodiment.

FIG. 10 illustrates an example of edge property data structures, in accordance with at least one embodiment. For purposes of the example 1000, it is assumed that a first node 1002 is linked in a graph to a second node 1004. It is further assumed that the edge linking these two nodes has one or more properties. It will be appreciated that this example is intended to be illustrative rather than limiting, and as such should not be construed so as to limit the scope of the present disclosure to only those cases and embodiments that conform to the specific example provided.

In at least one embodiment, the properties associated with the edge are stored according to the structure depicted in FIG. 10. These properties are stored in a property node 1006. The property node may be linked to the other nodes via a set of half-edges. For example, in at least one embodiment, the first node 1002 comprises a half-edge 1012 associated with the property node 1006, and the property node 1006 comprises a half-edge 1016 associated with the first node 1002. Likewise, the property node 1006 comprises a half-edge 1018 associated with the second node 1004, and the second node 1004 comprises a half-edge 1014 associated with the property node 1006. Note that here, with respect to a node that comprises a half-edge, the half-edges association with another node refers to an incoming or outgoing link to the other node. The property node 1006 may also contain an identifier 1020 and properties 1022, similarly to other node types.

Figure 11:
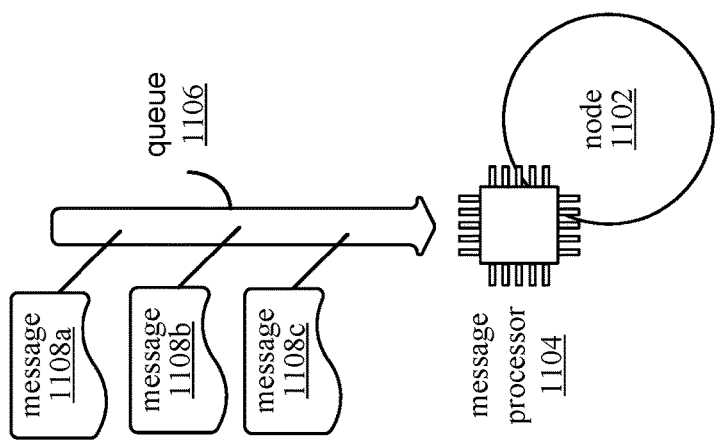
FIG. 11 illustrates an example of node message processing, in accordance with at least one embodiment.

FIG. 11 illustrates an example of node message processing, in accordance with at least one embodiment of a graph-based novelty detection system implemented using the graph database techniques described herein. In the example 100, a node 1102 of a graph is associated with a message processor 1104 and a queue 1106.

In at least one embodiment, the queue 1106 stores messages 1108*a-c* that are directed to the node 1102. For example, the queue 1106 may store messages addressed to the node's identifier. The messages 1108*a-c* are stored in a defined order, such as according to a timestamp.

In at least one embodiment, the graph processing system assigns exactly one message processor 1104 to a node 1102 of a graph. In these embodiments, a node of a graph, at any one time, may have either zero or one message processor 1104 assigned to it.

In at least one embodiment, the graph processing system assigns a queue 1106 to the node 1102 when at least one unprocessed message is directed to the node.

In at least one embodiment, the message processor 1104 removes a message 1108*c* from the queue 1106 in accordance with the defined order. For example, the messages 1108*a-c* may be stored in the queue based on a timestamp, so that earlier-timestamped messages may be removed and processed prior to later-timestamped messages.

A message, such as any one of the messages 1108*a-c*, may refer to instructions to perform an operation on the graph. Some messages may be described as comprising multiple portions, in that such a message might contain a portion applicable to the node 1102, and one or more additional portions applicable to other nodes in the graph. The message processor 1104 may therefore process the portion applicable to the node 1102, and then forward the message to one or more other nodes. When forwarding a message, the message processor 1104 may attach, to the message, results or status information pertaining to its handling of the message.

Figure 12:
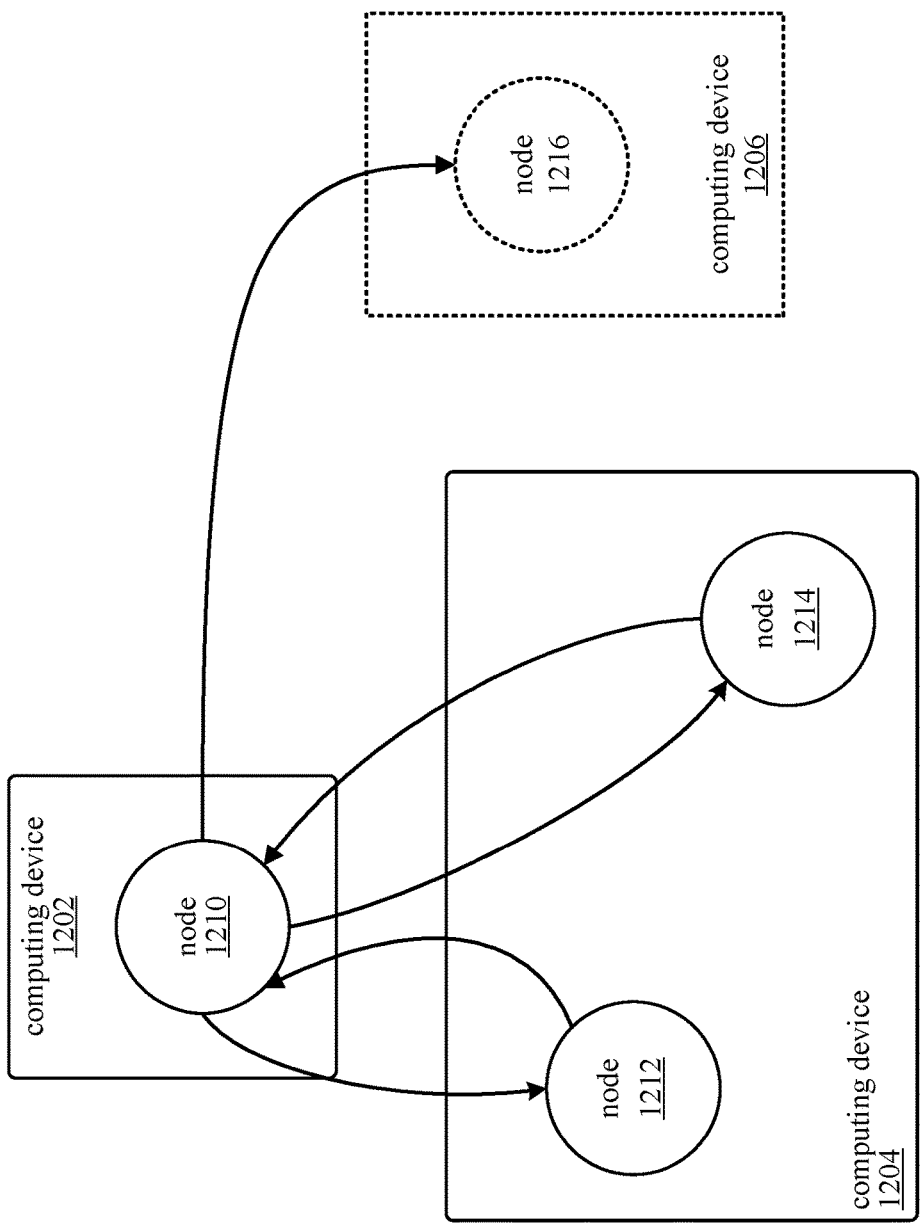
FIG. 12 illustrates an example system for scalable graph processing, in accordance with at least one embodiment.

FIG. 12 illustrates an example system for scalable graph processing, in accordance with at least one embodiment. Embodiments of a graph-based novelty detection system may be scaled using a variety of techniques, including by the use of independent models as described in relation to FIG. 2. However, there may be cases where it is advantageous to achieve scaling by distributing a model across a plurality of computing devices, rather than using fully independent models.

For illustrative purposes, the example 1200 of FIG. 12 describes a graph processing system comprising a plurality of computing devices 1202-1206. The scalability of the example system is achieved, in part, by a technique in which memory and processing resources for nodes are unallocated until needed. Moreover, the example system may permit the graph to be of considerable size and complexity, even when the memory or processing capability of the system is limited.

For illustrative purposes, the example 1200 of FIG. 12 assumes a conceptual graph comprising various nodes 1210-1216. Here, the term conceptual graph refers to the entirety of the graph not being backed, at a given time, with memory or processing capacity assigned to each and every node in the graph. In particular, while a first computing device 1202 might store records, such as node state and messages, for one of the graph nodes 1210, and a second computing device 1204 might do likewise for other nodes 1212-1214, there might be some nodes for which no such resources have been assigned. The node 1216, for example, might have no storage or processing capacity allocated to it.

In at least one embodiment, a computing device 1206 is associated with a node 1216 based in part on a message being directed to the node 1216. The graph processing system may determine that such a message exists and should be processed at the present time. The system may further determine that none of the presently assigned computing devices 1202, 1204 have sufficient capacity for processing messages directed to the node 1216. In response, the system determines to assign an unused or under-utilized computing device 1206 to the node 1216. In particular, in at least one embodiment, the system assigns a message processor, such as the message processor depicted in FIG. 11, to process messages directed to the node 1216. The system then forwards the message to the computing device 1206 for processing by the assigned message processor. The system, in at least one embodiment, also allocates storage on the computing device 1206 for storing the node's data.

Figure 13:
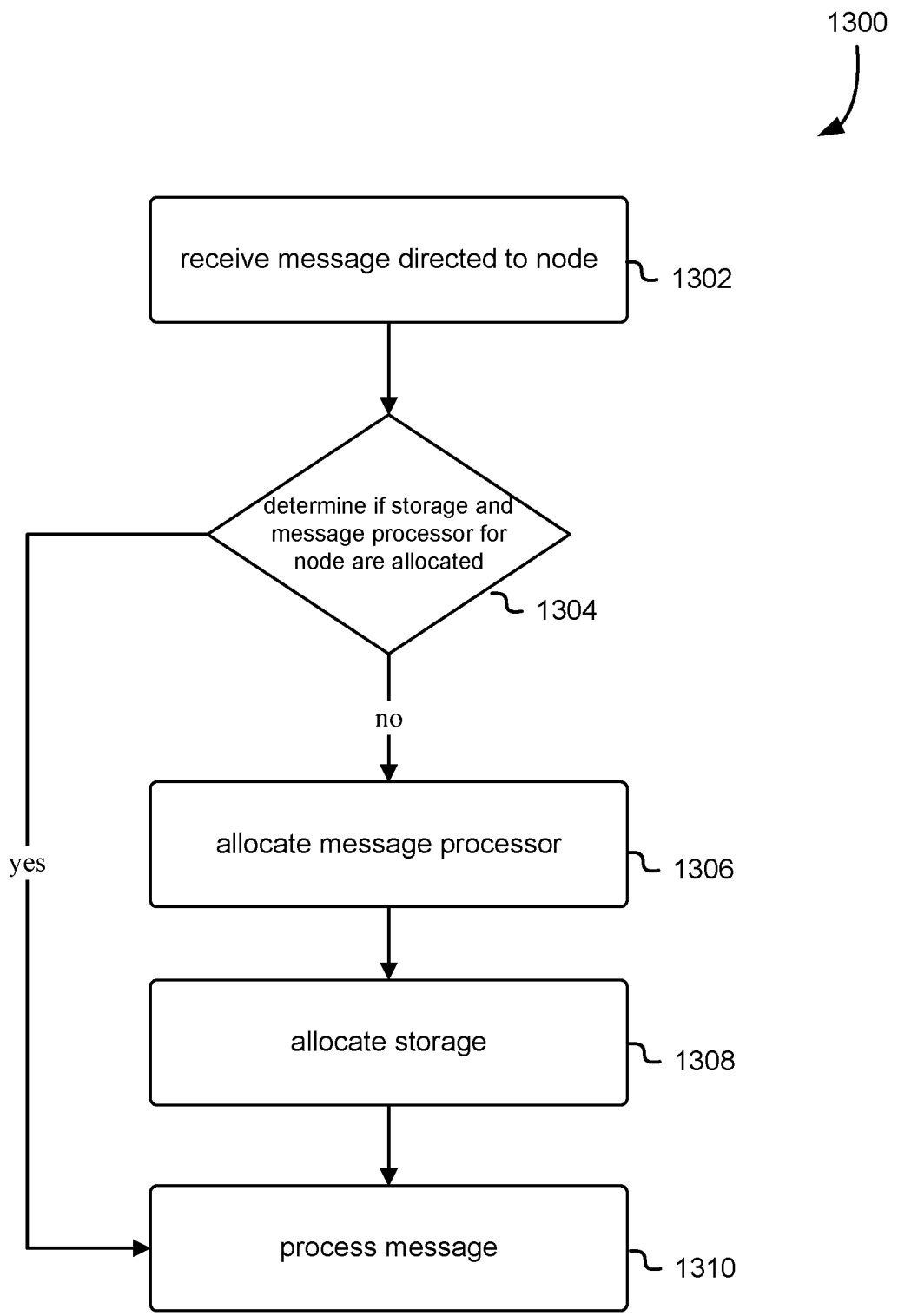
FIG. 13 is a flow diagram illustrating an example process for processing a message directed to a node of a graph, in accordance with at least one embodiment.

FIG. 13 is a flow diagram illustrating an example process for processing a message directed to a node of a graph, in accordance with at least one embodiment. It will be appreciated that the sequence of steps depicted in FIG. 13 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 1300 of FIG. 13 may be performed on any suitable computing system, or combination of computing systems, such as by the graph-based novelty detection system depicted in FIG. 1. In at least one embodiment, the example process 1300 is performed by a graph service module of a graph processing system, such as any one of the graph service modules depicted in FIG. 1. In at least one embodiment, the example is performed by a module configured to at least manage communications between shards, or partitions, of the graph.

At 1302, the system receives a message directed to a node. The message, in at least one embodiment, comprises information identifying the node, or nodes, to which the message is directed. The information may include a unique identifier of the node, a path to the node, criteria for locating the node, and so forth. In at least one embodiment, if a unique identifier is not included in the message, the graph processing system will use the other information to obtain the unique identifier of a node to which the message is directed. The identifier is used, in at least one embodiment, to route the message to a message processor.

In at least one embodiment, the message is added to a queue for subsequent processing by a message processor.

At 1304, the graph processing system determines if storage and a message processor are allocated for the node. In at least one embodiment, the processing system may defer allocating resources to the node until a message is directed to the node. Accordingly, when a message is received, the graph processing system may determine if the node has already been instantiated by allocating storage and a message processor to it. If these resources have been allocated, the system can proceed to process the message, at step 712. If not, the process continues at step 1306.

At 1306, the system allocates, or assigns, a message processor to the node. An allocated message processor, in at least one embodiment, will be the sole processor of messages directed to the node for the period of time during which the message processor is allocated. A message processor assigned to a node may be unassigned, and a different message processor assigned to the node at a later time.

At 1308, the system also allocates, or assigns, storage capacity for data associated with the node. This step may comprise determining a location for storing the node data. In at least one embodiment, the graph processing system uses storage on or connected to the same computing device as the message processor.

At 1310, the system processes the message. The message is processed, in at least one embodiment, by a message processor in accordance with a defined order.

In at least one embodiment, a queue for storing messages is associated with the node. The messages are added to the queue for subsequent processing by the node's message processor. The message processor serially removes messages from the queue and processes them, in accordance with the order.

In at least one embodiment, the processing of a message by the message processor, as depicted in step 1310, causes one or more events to be generated. The events may represent changes made to a node, such as a property being added, an edge removed, and so forth. These events may also be referred to as node events.

Figure 14:
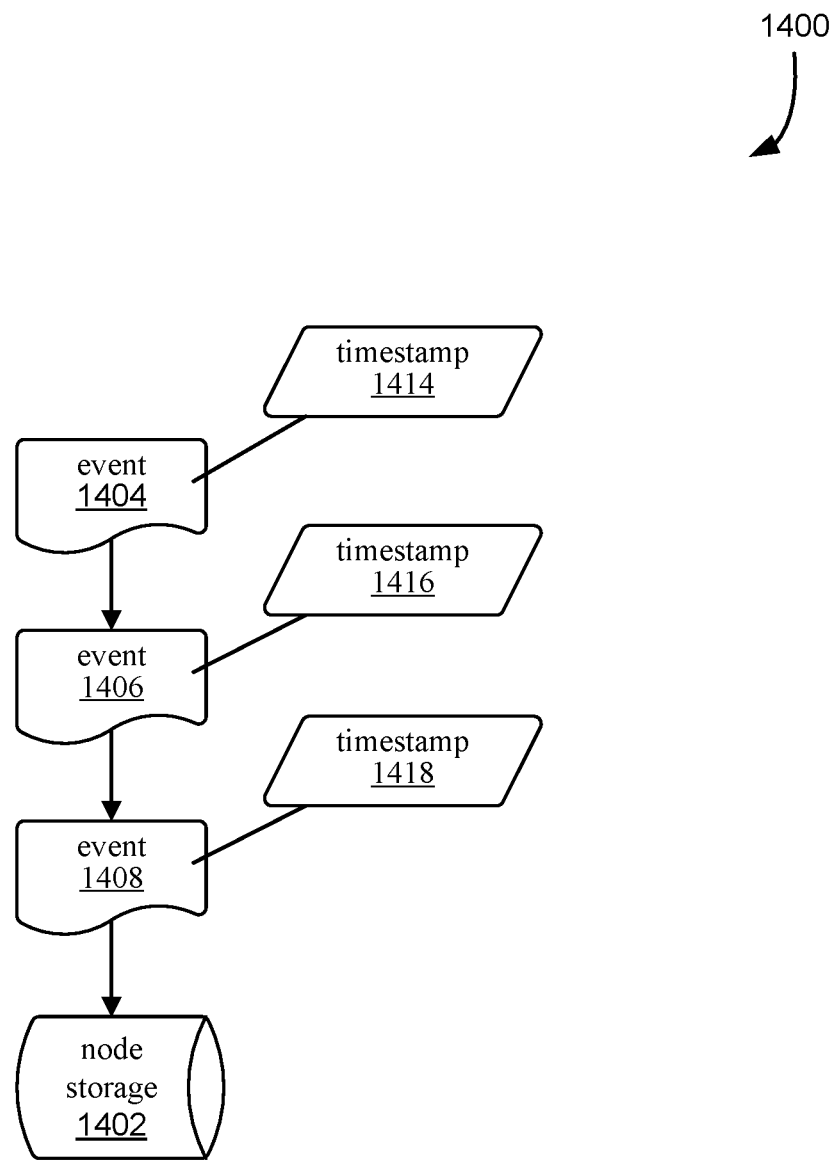
FIG. 14 illustrates an example of node event storage, in accordance with at least one embodiment.

FIG. 14 illustrates an example of node event storage, in accordance with at least one embodiment. The example 1400 of FIG. 14 shows that node data may be stored in an append-only log of events associated with that node. The events may, in cases and embodiments, represent changes to a node, such as the addition, removal, or modification of a property or edge.

In at least one embodiment, the events 1404-1408 are stored in an append-only log in node storage 1402. The node storage 1402, in at least one embodiment, comprises a data structure suitable for maintaining an append-only log. Each of the events 1404-1408 may also comprise a corresponding timestamp 1414-1418.

In at least one embodiment, the events are replayed from the log in order to restore a node's state. When a previously-instantiated node is started, e.g., by having a message processor assigned to it, the events 1404-1408 may be read and processed, in order, until the state of the node has been brought up-to-date. Alternatively, rather than replaying all events, the system may replay events up to a desired time. By doing so, the node's restored state will correspond to the state of the node at a desired time.

Figure 15:
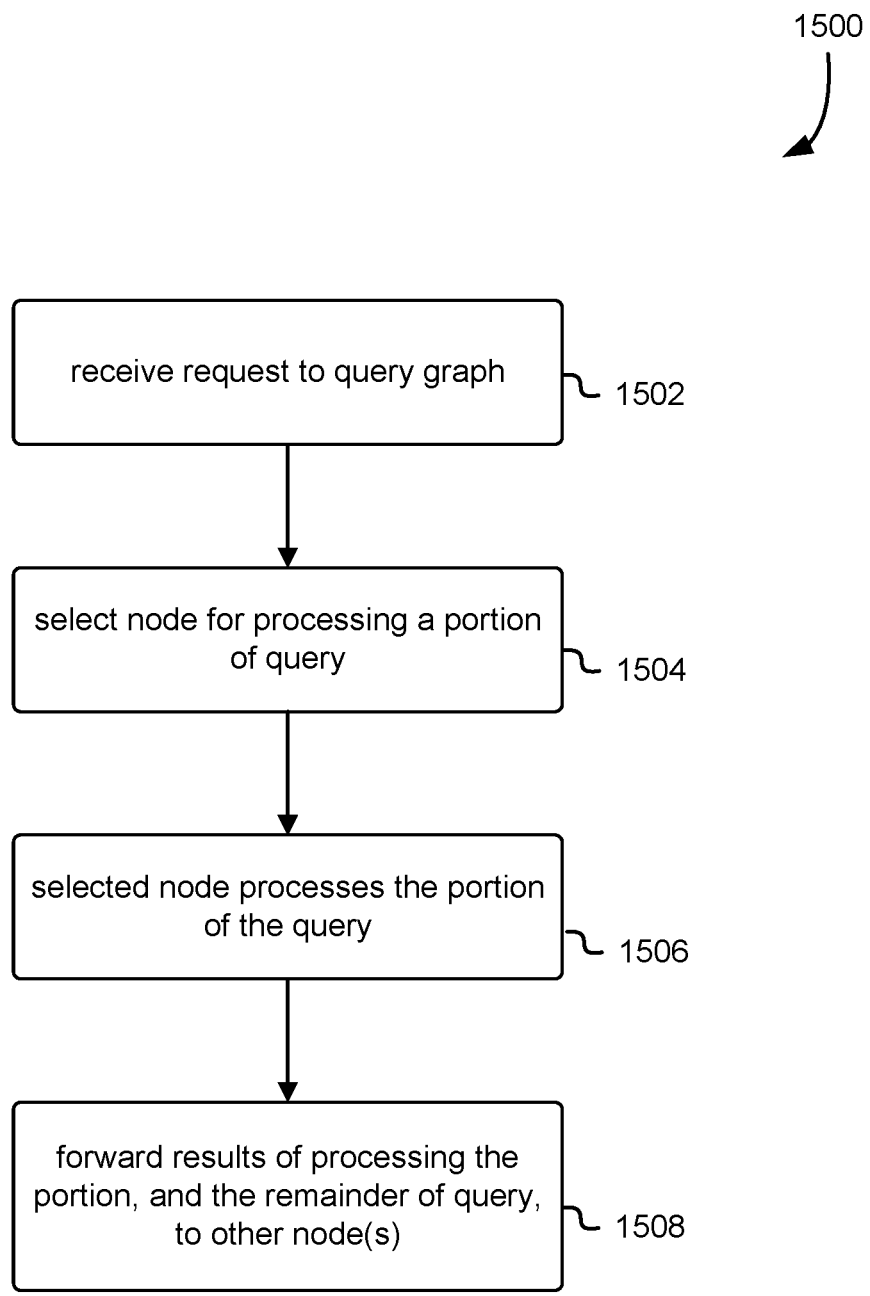
FIG. 15 is a flow diagram illustrating an example process for querying a graph, in accordance with at least one embodiment.

FIG. 15 is a flow diagram illustrating an example process for querying a graph, in accordance with at least one embodiment. It will be appreciated that the sequence of steps depicted in FIG. 15 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 1500 of FIG. 15 may be performed on any suitable computing system, or combination of computing systems, such as by the graph-based novelty detection system depicted in FIG. 1.

At 1502, the graph processing system receives a request to perform a query on a graph. In at least one embodiment, the query is received from a client as a set of class definitions. The class definitions may be provided in any of a number of programming languages. The graph processing system then converts these to an intermediate representation that has a hierarchical, tree-like, or graph-like structure.

At 504, the graph processing system selects a node for processing a portion of the query. The selected node may, in cases and embodiments, correspond to one whose properties conform to criteria defined in a portion of the query. For example, if the query has a hierarchical structure with a single root portion, the graph processing system might examine the root portion, identify the criteria expressed in that portion, and identify a node that conforms to that criteria. In another example, pattern-matching is performed, and a node conforming to the pattern is selected.

At 1506, the node's message processor processes the portion of the query. In at least one embodiment, this comprises applying the query portion's instructions to the current node state, in order to generate a result, sometimes referred to as a local result or node result, for that portion of the query.

At 1508, the results of processing the portion of the query are forwarded, along with the remainder of the query, to one or more other nodes. In at least one embodiment, the graph processing system selects a second portion of the query to process and identifies a node that conforms to a criteria or pattern associated with the second portion. The graph processing system then sends a message to that node, instructing it to process the second portion of the query. The message may be accompanied by the results obtained from processing the prior portion of the query. This process of node-by-node evaluation may continue until all required portions of the query have been successfully processed.

Figure 16:
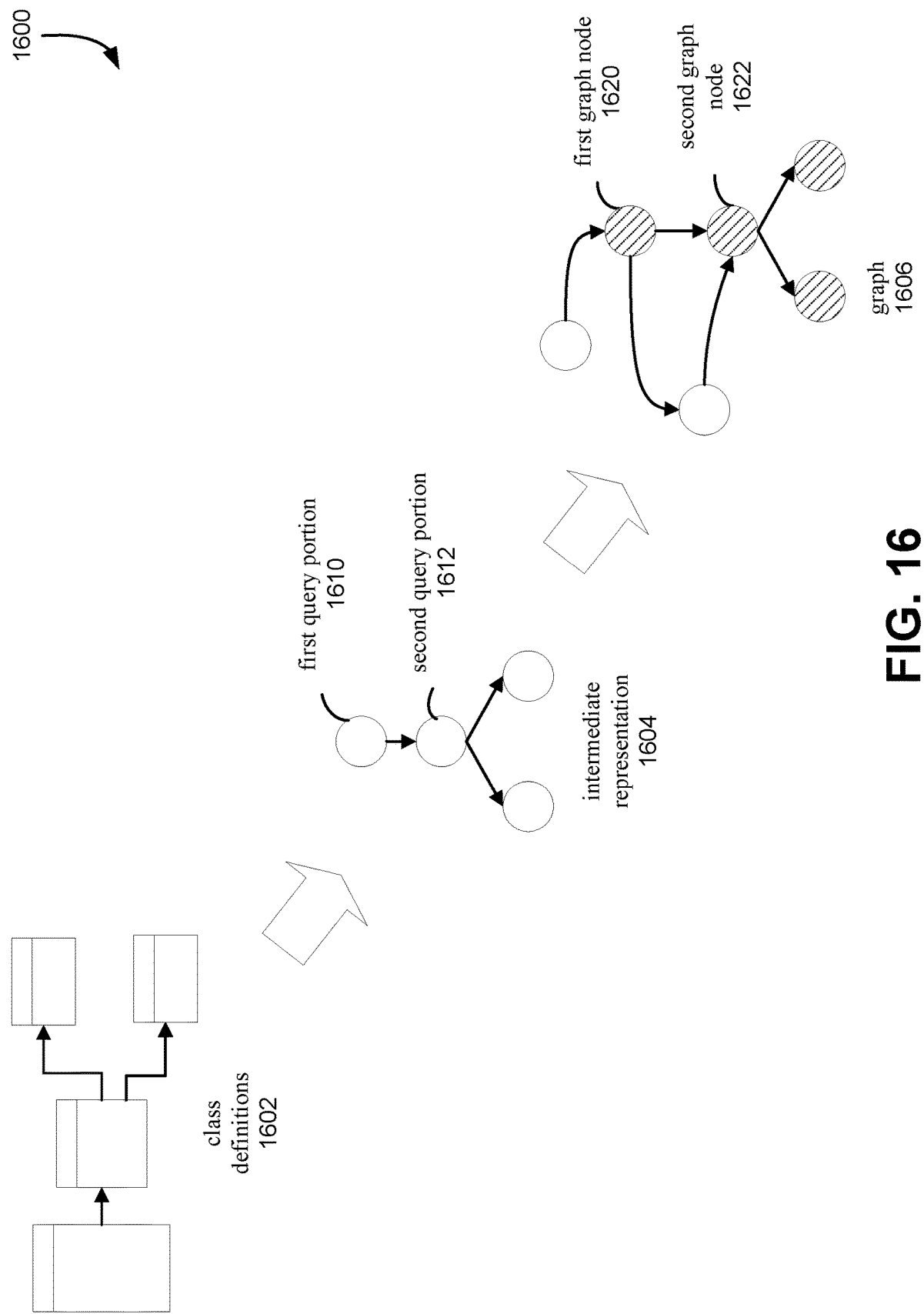
FIG. 16 illustrates further aspects of processing a query, in accordance with at least one embodiment.

FIG. 16 illustrates further aspects of processing a query, in accordance with at least one embodiment. As depicted in the example 1600, a set of class definitions 1602 defines a query. The class definitions 1602 are converted to an intermediate representation 1604 which has a hierarchical, tree-like, or graph-like structure. The query is then processed by identifying a region in the graph 1606 that conforms to the pattern defined by the query. For example, the graph processing system may process the first graph portion 1610 at a first graph node 1620, and then forward the local results from processing the first portion 1610 to the second graph node 1622. The second graph node can be selected, for example, based on some property of an edge between the two nodes, or simply because the two nodes are linked. It will be appreciated that these examples are intended to be illustrative, and as such should not be construed in a manner which would limit the scope of the present disclosure to only those embodiments which conform to the specific examples provided. The second node may then process the second query portion 1612. This process may complete until each query portion in the intermediate representation has been evaluated successfully, resulting in the location of a region of the graph that matches the pattern defined by the intermediate representation 1604. The evaluation of the query may, however, be ended prior to completion. This might occur, for example, if no suitable node can be found to continue evaluating the unevaluated portions of the query.

Figure 17:
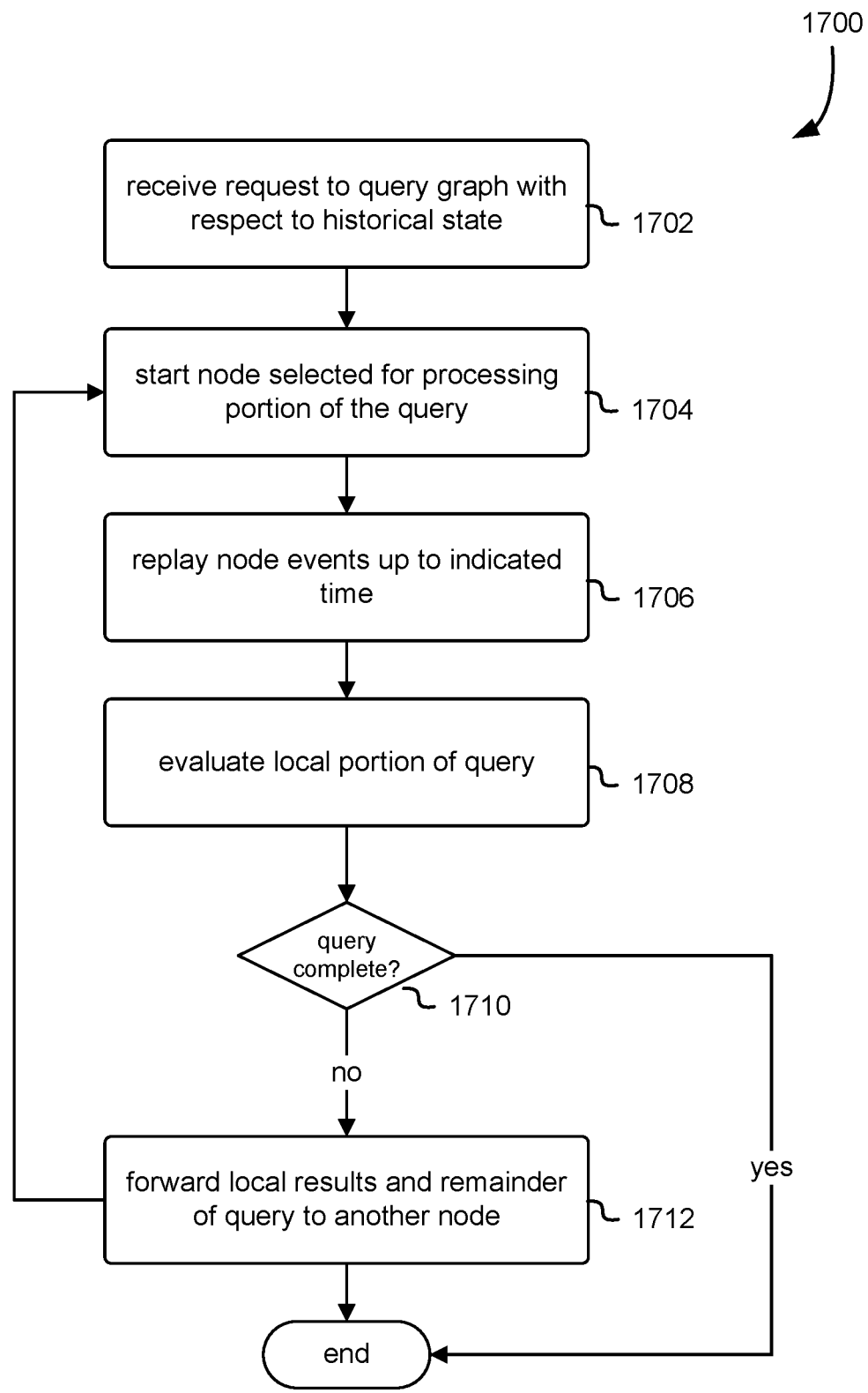
FIG. 17 is a flow diagram illustrating an example process of executing a query of a graph as of an indicated historical state, in accordance with at least one embodiment.

FIG. 17 is a flow diagram illustrating an example process of executing a query of a graph as of an indicated historical state, in accordance with at least one embodiment. It will be appreciated that the sequence of steps depicted in FIG. 17 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 1700 of FIG. 17 may be performed on any suitable computing system, or combination of computing systems, such as by the graph-based novelty detection system depicted in FIG. 1.

At 1702, the graph processing system receives a request to query a graph with respect to a historical state. Here, historical state refers to the condition of the graph as of an earlier time, including the nodes, properties, edges, and other data as they were at the indicated time.

At 1704, the graph processing system starts a node of the graph that has been selected as a candidate for processing a portion of the query.

At 1706, the graph processing system replays node events up to the indicated time, which results in the state of the node being synchronized with the desired historical state.

At 1708, the node evaluates a local portion of the query, based on the historical state achieved at step 1706. Here, the portion of the query that the node will evaluate is referred to as the local portion.

If the query is not yet complete, as determined at step 1710, the evaluation of the query may continue by forwarding, at step 1712 the local results of the evaluation, along with the remaining portions of the query, to another node. This node may then be started, its events replayed up to the indicated time, and its local portion evaluated. This process may then continue until evaluation of the query has been completed, or otherwise ended.

Figure 18:
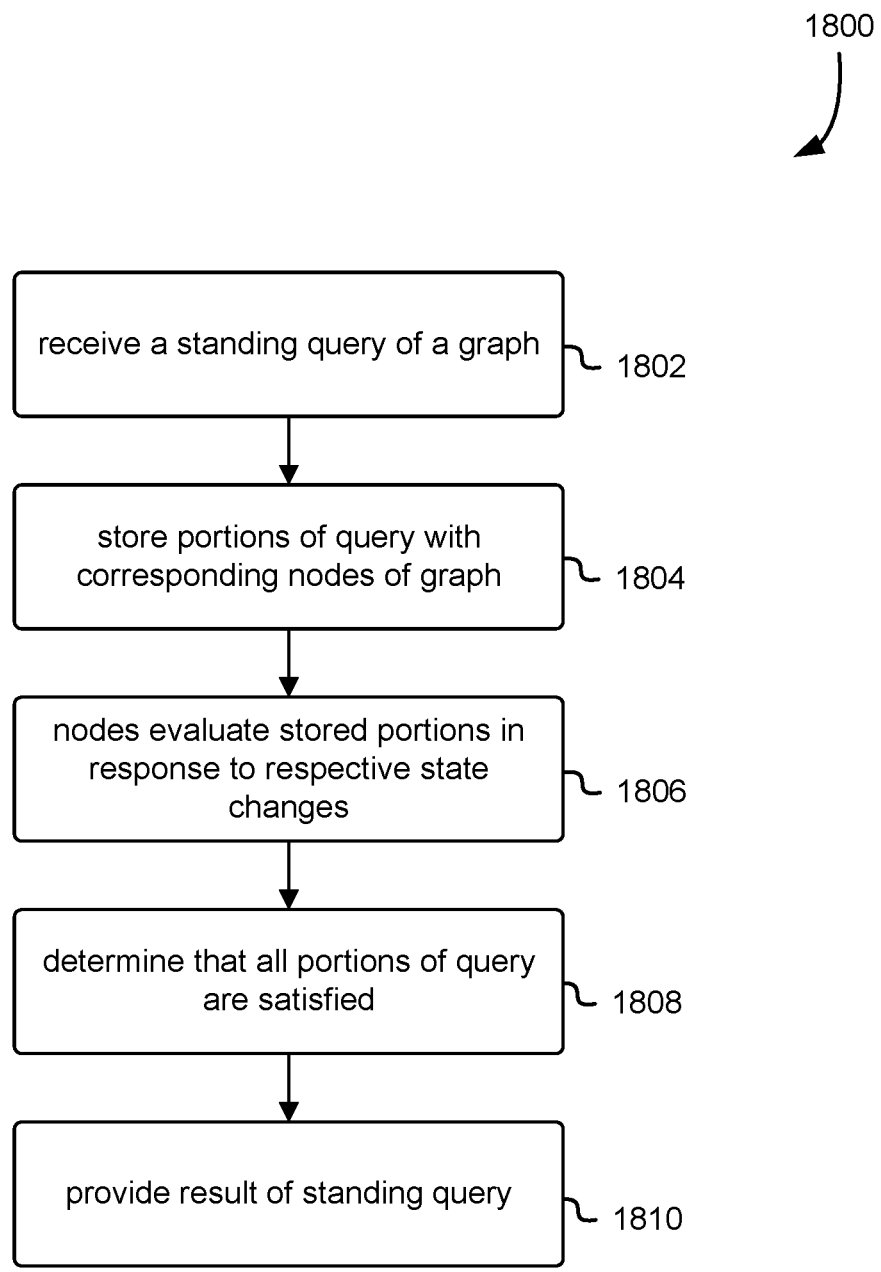
FIG. 18 is a flow diagram illustrating an example process of maintaining a standing query of a graph, in accordance with at least one embodiment.

FIG. 18 is a flow diagram illustrating an example process of maintaining a standing query of a graph, in accordance with at least one embodiment. It will be appreciated that the sequence of steps depicted in FIG. 18 is intended to be illustrative. In various embodiments, the example process may be performed using a sequence of steps that differs from the depicted sequence. For example, except where logically required, such as when the output of one step is used as input for a subsequent step, the depicted steps may be altered, omitted, combined with other steps, or performed in parallel.

The example process 1800 of FIG. 18 may be performed on any suitable computing system, or combination of computing systems, such as by the graph-based novelty detection system depicted in FIG. 1.

At 1802, the system receives a standing query of a graph. A standing query may refer to a query that is analogous, in at least some respects, to a subscription. When a client issues a standing query, it indicates that it wishes to receive a notification when the criteria or pattern defined by the standing query is matched.

At 1804, the system stores portions of the query with corresponding nodes of the graph. For the purpose of maintaining a standing query, a portion of the query may be said to correspond to a node when it would be appropriate for that node to process the corresponding portion. For example, certain portions of a query might be applicable only to nodes with certain properties.

At 1806, the nodes evaluate their stored query portions in response to a respective change to their state. For example, when a first node is updated, it may evaluate the stored query portion associated with it. A second node may do likewise, when its state changes, with its corresponding portion of the query.

At 1808, the system determines that all portions of the query have been satisfied. In other words, the system determines that the criteria or pattern has been satisfied or matched, based on the evaluations of the stored query portions as performed by the respective nodes.

At 1810, the system provides a result of the standing query, in response to the determination of step 1208.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a device or system, thereby causing the device or system to perform the specified operations.

In at least one embodiment, the system provides control over consistency trade-offs, such as providing support for ACID properties or for eventual consistency. For example, in at least one embodiment, at least one computing device performs a process comprising storing a graph of data as a plurality of nodes. The process further comprises receiving a query of the graph, where the query indicates a desired level of consistency for at least a portion of the query. The process further comprises identifying a timeframe that is in accordance with the desired consistency level. For example, strict conformance to ACID properties may indicate that the time must correspond closely to the time the query was received. Other forms of consistency may allow for use of any data from the time the query was issued up to the present. The process further comprises identifying a node to process the portion of the query, and confirming that the state of that node corresponds to a point in time that is within the indicated timeframe.

In a further aspect of the example process, the graph processing system returns results of the query that comprise data indicating the window of time used to process the query. For example, if processing the query involved a node state from time X, the results of the query might so indicate.

In a further aspect of the example process, additional queries, or query portions, may be executed using different consistency requirements.

In a further aspect of the example process, the desired consistency level may be achieved by acquiring a read lock and/or write lock on the node.

In a further aspect of the example process, the desired consistency level may be achieved by adjusting the node's state so that it conforms to the necessary timeframe. For example, if the current state of a node is based on a change made after the desired timeframe, the state of the node may be rolled back using data in the node's log storage. Likewise, if the node's current state is before the required timeframe, the state may be rolled forward.

Figure 19:
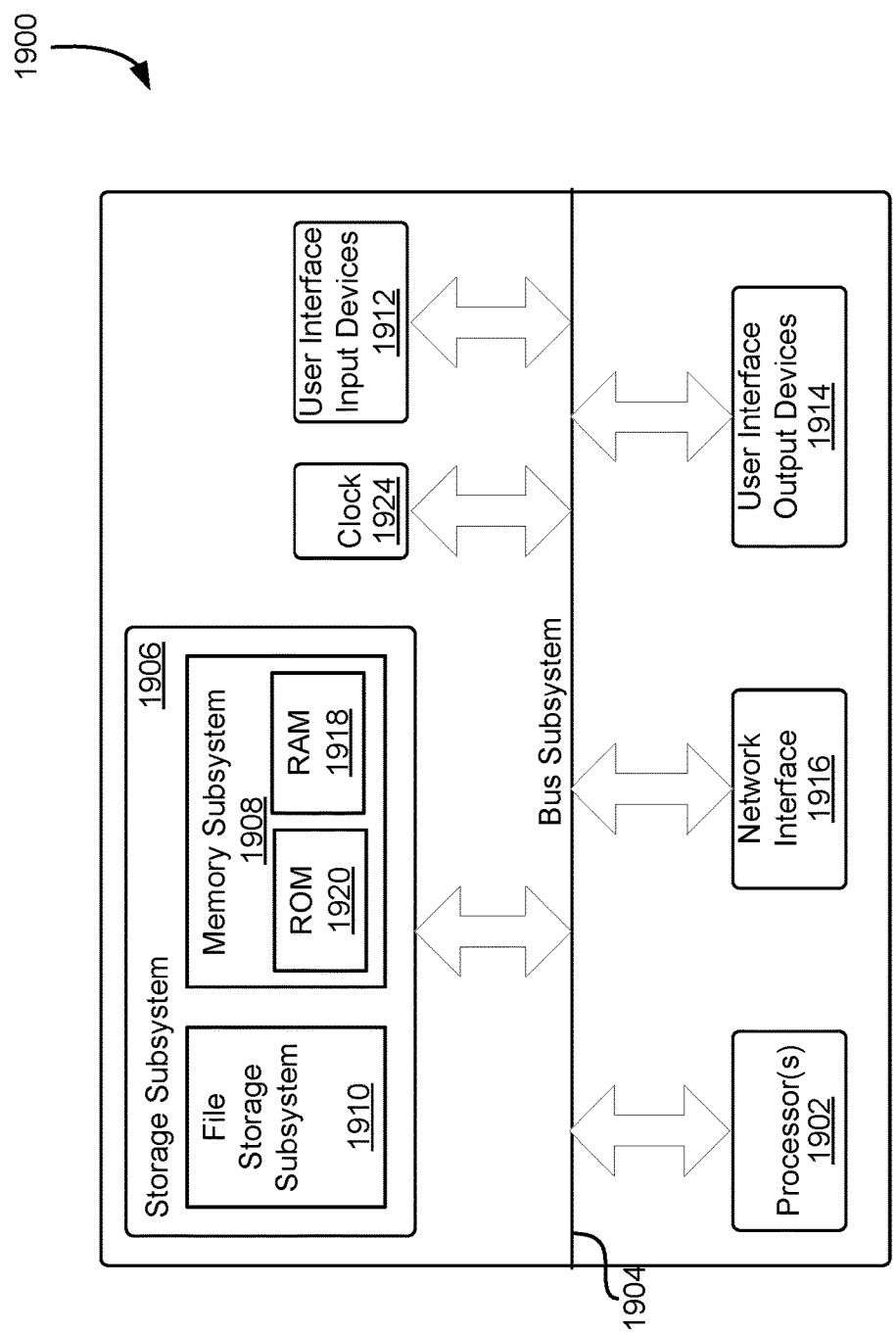
FIG. 19 illustrates an environment in which various embodiments can be implemented, in accordance with an embodiment.

FIG. 19 is an illustrative block diagram of a computing device 1900 that can be used to practice at least one embodiment of the present disclosure. In various embodiments, the computing device 1900 may be used to implement any of the systems illustrated and described above. For example, the computing device 1900 may be configured for use as a database or graph processing system. Embodiments of the computing device 1900 may include, but are not limited to, servers, web servers, portable computing devices, personal computers, smartphones, and other electronic computing devices. As shown in FIG. 19, the computing device 1900 may include one or more processors 1902 that, in embodiments, communicate with and are operatively coupled to a number of peripheral subsystems via a bus subsystem. In some embodiments, these peripheral subsystems include a storage subsystem 1906, comprising a memory subsystem 1908 and a file/disk storage subsystem 1910, one or more user interface input devices 1912, one or more user interface output devices 1914, and a network interface subsystem 1916. Such a storage subsystem 1306 may be used for temporary or long-term storage of information.

In some embodiments, the bus subsystem 1904 may provide a mechanism for enabling the various components and subsystems of computing device 1900 to communicate with each other as intended. Although the bus subsystem 1904 is shown schematically as a single bus, alternative embodiments of the bus subsystem utilize multiple buses. The network interface subsystem 1916 may provide an interface to other computing devices and networks. The network interface subsystem 1916 may serve as an interface for receiving data from and transmitting data to other systems from the computing device 1900. In some embodiments, the bus subsystem 1904 is utilized for communicating data such as details, search terms, and so on.

In some embodiments, the user interface input devices 1912 include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1900. In some embodiments, the one or more user interface output devices 1914 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1900. The one or more user interface output devices 1914 can be used, for example, to present user interfaces to facilitate user interaction with applications performing processes described and variations therein, when such interaction may be appropriate.

In some embodiments, the storage subsystem 1906 provides a non-transitory computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1906. These application modules or instructions can be executed by the one or more processors 1902. In various embodiments, the storage subsystem 1906 additionally provides a repository for storing data used in accordance with the present disclosure. In some embodiments, the storage subsystem 1906 comprises a memory subsystem 1908 and a file/disk storage subsystem 1910.

In embodiments, the memory subsystem 1908 includes a number of memories, such as a main random access memory (RAM) 1918 for storage of instructions and data during program execution and/or a read only memory (ROM) 1920, in which fixed instructions can be stored. In some embodiments, the file/disk storage subsystem 1910 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1900 includes at least one local clock 1924. The at least one local clock 1924, in some embodiments, is a counter that represents the number of ticks that have transpired from a particular starting date and, in some embodiments, is located integrally within the computing device 1900. In various embodiments, the at least one local clock 1924 is used to synchronize data transfers in the processors for the computing device 1900 and the subsystems included therein at specific clock pulses and can be used to coordinate synchronous operations between the computing device 1900 and other systems in a data center. In another embodiment, the local clock is a programmable interval timer.

The computing device 1900 could be of any of a variety of types, including a portable computer device, tablet computer, a workstation, server, Internet-of-Things ("IoT") device, or any other device described below. Additionally, the computing device 1900 can include another device that, in some embodiments, can be connected to the computing device 1900 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 1900 for processing. Due to the ever-changing nature of computers and networks, the description of the computing device 1900 depicted in FIG. 19 is intended only as a specific example for purposes of illustrating the preferred embodiment of the device. Many other configurations having more or fewer components than the system depicted in FIG. 13 are possible.

The various embodiments disclosed herein may be further understood in view of the following clauses:

1. A system, comprising:
   at least one processor; and
   at least one memory storing instructions that, in response to execution by the at least one processor, cause the system to:
   store, in a graph, a first plurality of nodes indicative of an observation read from a stream of observations, wherein nodes of the first plurality of nodes correspond to pieces of information in the observation, and wherein the nodes of the first plurality of nodes comprise information indicative of a number of times one or more pieces of categorical information have been observed in the stream of observations;
   calculate a score indicative of a degree to which the observation is an outlier with respect to other observations read from the stream of observations, the score calculated based at least in part on the number of times the one or more pieces of categorical information has been observed; and
   send the score to a client process.
2. The system of clause 1, wherein the first plurality of nodes comprise an ordered sequence that corresponds to a sequence of an observation read from the stream of observations.
3. The system of clause 1 or 2, wherein the score is calculated based, at least in part, on a conditional probability computed based, at least in part, on a first node of the ordered sequence and a second node of the ordered sequence, the second node subsequent to the first node in the sequence.
4. The system of clause 3, wherein the conditional probability is computed based, at least in part, on a first number of times a first piece of categorical information has been observed in the stream of observations and on a second number of times a second piece of categorical information has been observed in the stream of observations, wherein data for the first number of times is obtained from the first node of the sequence, wherein data for the second number of times is obtained from the second node of the sequence.
5. The system of any of clauses 1-4, the at least one memory storing further instructions that, in response to execution by the at least one processor, cause the system to:
   increment a counter of a node of the first plurality of nodes, the node also included in a second plurality of nodes overlapping with the first plurality of nodes, the node representing a piece of information in the observation that corresponds to a piece of information in the second observation.
6. The system of any of clauses 1-5, the at least one memory storing further instructions that, in response to execution by the at least one processor, cause the system to:
   traverse a path through the graph, the path defined by components of the observation; and
   increment counters of nodes on the path that correspond to pieces of information in the observation.
7. The system of any of clauses 1-6, the at least one memory storing further instructions that, in response to execution by the at least one processor, cause the system to:
   traverse a path defined by components of the observation.
8. The system of any of clauses 1-7, wherein the score is calculated based, at least in part, on a probability determined based, at least in part, on the number of times the piece of categorical information has been observed and a second number of times a prior piece of categorical information has been observed in the observation.
9. The system of any of clauses 1-8, wherein the score is adjusted based at least in part on relative information conveyed by a number of available alternative observations.
10. The system of any of clauses 1-9, the at least one memory storing further instructions that, in response to execution by the at least one processor, cause the system to:
    determine that cardinality of a node of the plurality of nodes exceeds a threshold level; and in response to the determination, replace one or more edges of the node with a counter indicative of a number of children of the node.

11. A computer-implemented method, comprising:
generating a graph representation based, at least in part, on a stream of observations,
  wherein the graph comprises at least a first plurality of node representations,
  wherein the first plurality of node representations is indicative of an observation read from the stream of observations,
  wherein a node of the first plurality of node representations comprises information indicative of a number of times a piece of categorical information has been observed in the stream of observations;
calculating a score indicative of a degree to which the observation is an outlier with respect to other observations, the score based, at least in part, on the number of times the piece of categorical information has been observed; and
providing the score.

12. The computer-implemented method of clause 11, wherein the graph representation comprises information indicative of a tree and the tree comprises the first plurality of nodes.

13. The computer-implemented method of clause 11 or 12, further comprising:
incrementing a counter of a node, of the first plurality of node representations, that represents a piece of information in the observation that corresponds to a piece of information in a second observation.

14. The computer-implemented method of any of clauses 11-13, further comprising:
traversing a path through the graph representation, the path defined by components of the observation; and
incrementing counters of node representations on the path that correspond to pieces of information in the observation.

15. The computer-implemented method of any of clauses 11-14, wherein the score is calculated based, at least in part, on a conditional probability determined based, at least in part, on the number of times the piece of categorical information has been observed and a second number of times a prior piece of categorical information has been observed in the observation.

16. The computer-implemented method of any of clauses 11-15, further comprising:
determining an order of the first plurality of node representations based, at least in part, on one or more of cardinality of a piece of information in the observation, a weighted graph model, or an example of an anomalous observation.

17. A non-transitory computer-readable storage medium comprising instructions that, in response to execution by at least one processor of one or more computing devices, cause the one or more computing devices to at least:
receive data indicative of a stream of observations;
store a plurality of nodes in a graph, the plurality of nodes representative of an observation read from the stream of observations, wherein a node in the plurality of nodes comprising information indicative of a number of times a piece of information has been observed in the stream of observations;
determine a score indicative of a degree to which the observation is an outlier with respect to other observations, the score based, at least in part, on the number of times the piece of information has been observed; and
provide the score.

18. The non-transitory computer-readable storage medium of clause 17, comprising further instructions that, in response to execution by at least one processor of one or more computing devices, cause the one or more computing devices to at least:
traverse a path through the graph, the path defined by components of the observation; and
increment counters of nodes on the path that correspond to pieces of information in the observation.

19. The non-transitory computer-readable storage medium of clause 17 or 18, comprising further instructions that, in response to execution by at least one processor of one or more computing devices, cause the one or more computing devices to at least:
determine the number of times the piece of information has been observed in the stream of observations;
obtain a count of a number of siblings of a node in the first plurality of nodes;
compute a conditional probability of the piece of information occurring in the stream of observations;
compute an indicator of information content associated with the conditional probability; and
scale the indicator based, at least in part, on the count of the number of siblings.

20. The non-transitory computer-readable storage medium of clause 19, wherein the score is based, at least in part, on the scaled indicator.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated, and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media, and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments are envisioned. As such, embodiments of the present disclosure may be practiced otherwise than as specifically described. Accordingly, the scope of the present disclosure includes all modifications and equivalents of the subject matter recited in the clauses appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

What is claimed is:

1. A system, comprising:
   at least one processor; and
   at least one memory storing instructions that, in response to execution by the at least one processor, cause the system to:
   store, in a graph data structure, a representation of an observation, the representation comprising at least a first node indicative of a first piece of categorical information and a first number of times the first piece of categorical information has been observed in a stream of observations, and a second node indicative of a second piece of categorical information and a second number of times the second piece of categorical information has been observed in the stream of observations;
   update the first node to indicate that the first piece of categorical information has been observed again in the stream of observations;
   calculate, using the graph data structure, a score indicative of a degree to which the observation is an outlier with respect to other observations read from the stream of observations, the score calculated based at least in part on one or more probabilities computed based, at least in part, on the first number of times the first piece of categorical information has been observed in the stream of observations, and the second number of times the second piece of categorical information has been observed in the stream of observations; and
   send the score to a client process.

2. The system of claim 1, wherein the first and second nodes indicate an ordered sequence that corresponds to a sequence of an observation read from the stream of observations.

3. The system of claim 2, wherein the one or more probabilities comprise a conditional probability computed based, at least in part, on the first and second nodes in the ordered sequence.

4. The system of claim 3, wherein the conditional probability is computed based, at least in part, on the first number of times the first piece of categorical information has been observed in the stream of observations and on the second number of times the second piece of categorical information has been observed in the stream of observations, wherein data for the first number of times is obtained from the first node and data for the second number of times is obtained from the second node.

5. The system of claim 1, wherein the observation is represented in the graph data structure by a first plurality of nodes comprising the first and second nodes, and wherein a second observation is represented in the graph data structure by a second plurality of nodes comprising at least one node of the first plurality of nodes.

6. The system of claim 1, the at least one memory storing further instructions that, in response to execution by the at least one processor, cause the system to:
traverse a path through the graph data structure, the path defined by components of the observation; and
increment counters of nodes on the path that correspond to pieces of information in the observation.

7. The system of claim 1, the at least one memory storing further instructions that, in response to execution by the at least one processor, cause the system to:
traverse a path defined by components of the observation.

8. The system of claim 1, wherein the one or more probabilities are computed based, at least in part, on traversing the graph data structure to obtain the first number of times the first piece of categorical information has been observed and the second number of times the second piece of categorical information has been observed in the observation.

9. The system of claim 1, wherein the score is adjusted based at least in part on relative information conveyed by a number of available alternative observations stored in the graph data structure.

10. The system of claim 1, the at least one memory storing further instructions that, in response to execution by the at least one processor, cause the system to:
determine that cardinality of a node of a first plurality of nodes in the graph data structure exceeds a threshold level; and
in response to the determination, replace one or more records indicative of edges of the node with a counter indicative of a number of children of the node.

11. A computer-implemented method, comprising:
generating a graph data structure based, at least in part, on a stream of observations,
wherein the graph data structure comprises at least a first plurality of nodes,
wherein the first plurality of nodes represent an observation read from the stream of observations, and
wherein a first node of the first plurality of nodes comprises information indicative of a first number of times a first piece of categorical information has been observed in the stream of observations, and a second node of the first plurality of nodes comprises information indicative of a second number of times a second piece of categorical information has been observed in the stream of observations;
calculating a score indicative of a degree to which the observation is an outlier with respect to other observations, the score based, at least in part, on a probability computed based, at least in part, on the first number of times the first piece of categorical information has been observed and the second number of times the second piece of categorical information has been observed; and
providing the score to a client process.

12. The computer-implemented method of claim 11, wherein the graph data structure comprises information indicative of a tree and the tree comprises the first plurality of nodes.

13. The computer-implemented method of claim 11, further comprising:
incrementing a counter of a node, of the first plurality of nodes, that represents a piece of information in the observation that corresponds to a piece of information in a second observation.

14. The computer-implemented method of claim 11, further comprising:
traversing a path through the graph data structure, the path defined by components of the observation; and
incrementing counters of node representations on the path that correspond to pieces of information in the observation.

15. The computer-implemented method of claim 11, wherein the probability is based, at least in part, on a conditional probability determined based, at least in part, on the first number of times the first piece of categorical information has been observed and the second number of times the second piece of categorical information has been observed.

16. The computer-implemented method of claim 11, further comprising:
determining an order of the first plurality of nodes based, at least in part, on one or more of cardinality of a piece of information in the observation, a weighted graph model, or an example of an anomalous observation.

17. A non-transitory computer-readable storage medium comprising instructions that, in response to execution by at least one processor of one or more computing devices, cause the one or more computing devices to at least:
receive data indicative of a stream of observations;
store a plurality of nodes in a graph data structure, the plurality of nodes representative of an observation read from the stream of observations, wherein a first node in the plurality of nodes comprises a first value indicative of a first number of times a first piece of information has been observed in the stream of observations and a second node in the plurality of nodes comprises a second value indicative of a second number of times a second piece of information has been observed in the stream of observations;
determine a score indicative of a degree to which the observation is an outlier with respect to other observations stored in the graph data structure, the score based, at least in part, on a probability computed using the first value indicative of the first number of times the first piece of information has been observed and the second value indicative of the second number of times the second piece of information has been observed; and
provide the score.

18. The non-transitory computer-readable storage medium of claim 17, comprising further instructions that, in response to execution by at least one processor of one or more computing devices, cause the one or more computing devices to at least:
traverse a path through the graph data structure, the path defined by components of the observation; and
increment counters of nodes on the path that correspond to pieces of information in the observation.

19. The non-transitory computer-readable storage medium of claim 17, comprising further instructions that, in response to execution by at least one processor of one or more computing devices, cause the one or more computing devices to at least:
- determine, using the graph data structure, the number of times the first piece of information has been observed in the stream of observations;
- obtain a count of a number of siblings of the first node;
- compute a conditional probability of the first piece of information occurring in the stream of observations;
- compute an indicator of information content associated with the conditional probability; and
- scale the indicator based, at least in part, on the count of the number of siblings.

20. The non-transitory computer-readable storage medium of claim 19, wherein the score is based, at least in part, on the scaled indicator.

* * * * *